Figure 1:
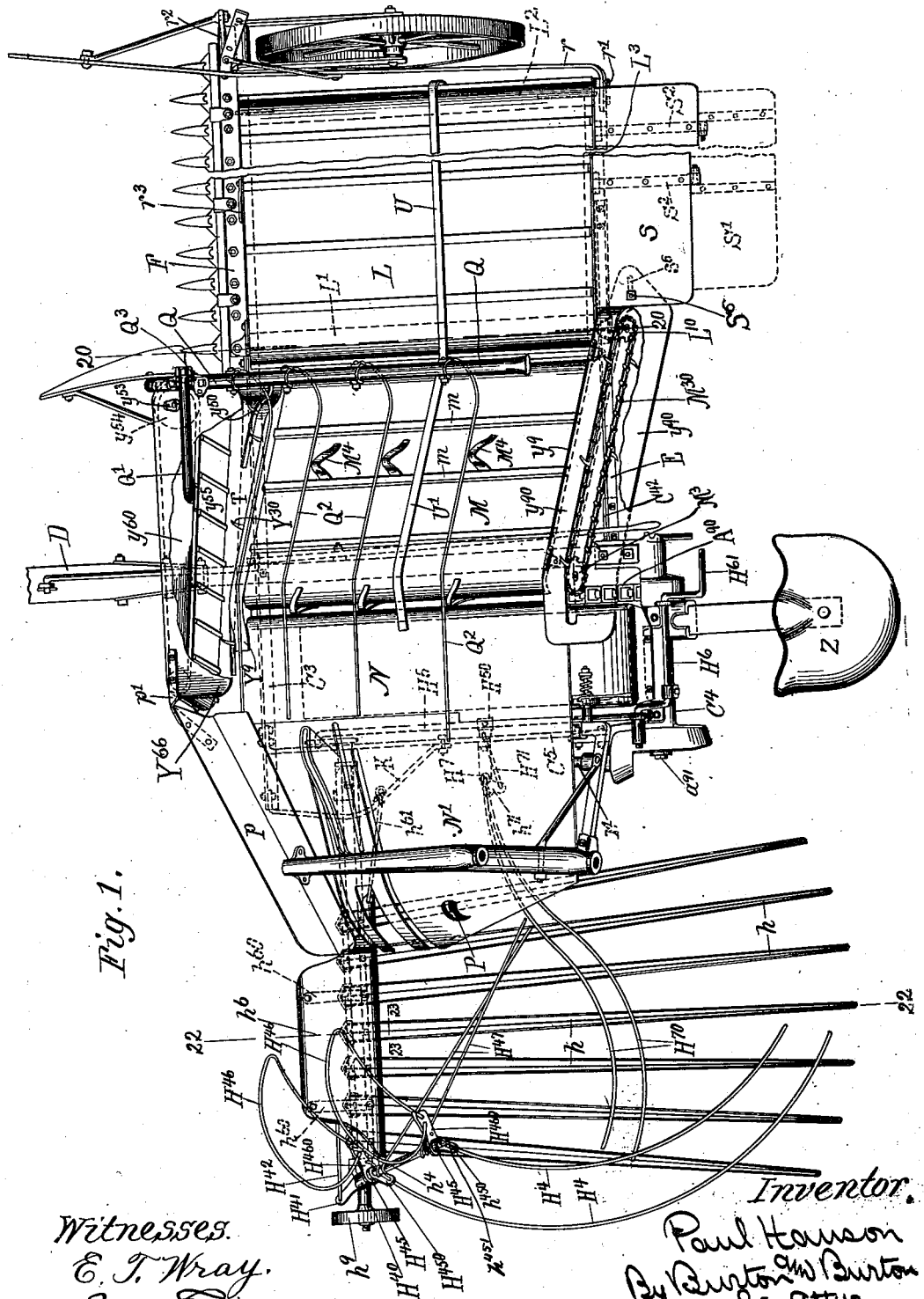

(No Model.) 9 Sheets—Sheet 2.

P. HANSON.
HARVESTER.

No. 523,661. Patented July 31, 1894.

Witnesses.
E. T. Wray.
Jean Elliott

Inventor:
Paul Hanson
By Burton and Burton
his Attys (No Model.)
9 Sheets—Sheet 5.

P. HANSON.
HARVESTER.

No. 523,661. Patented July 31, 1894.

Witnesses:
E. T. Wray.
Jean Elliott

Inventor:
Paul Hanson
By Burton and Burton
his Attys (No Model.) 9 Sheets—Sheet 6.
P. HANSON.
HARVESTER.
No. 523,661. Patented July 31, 1894.
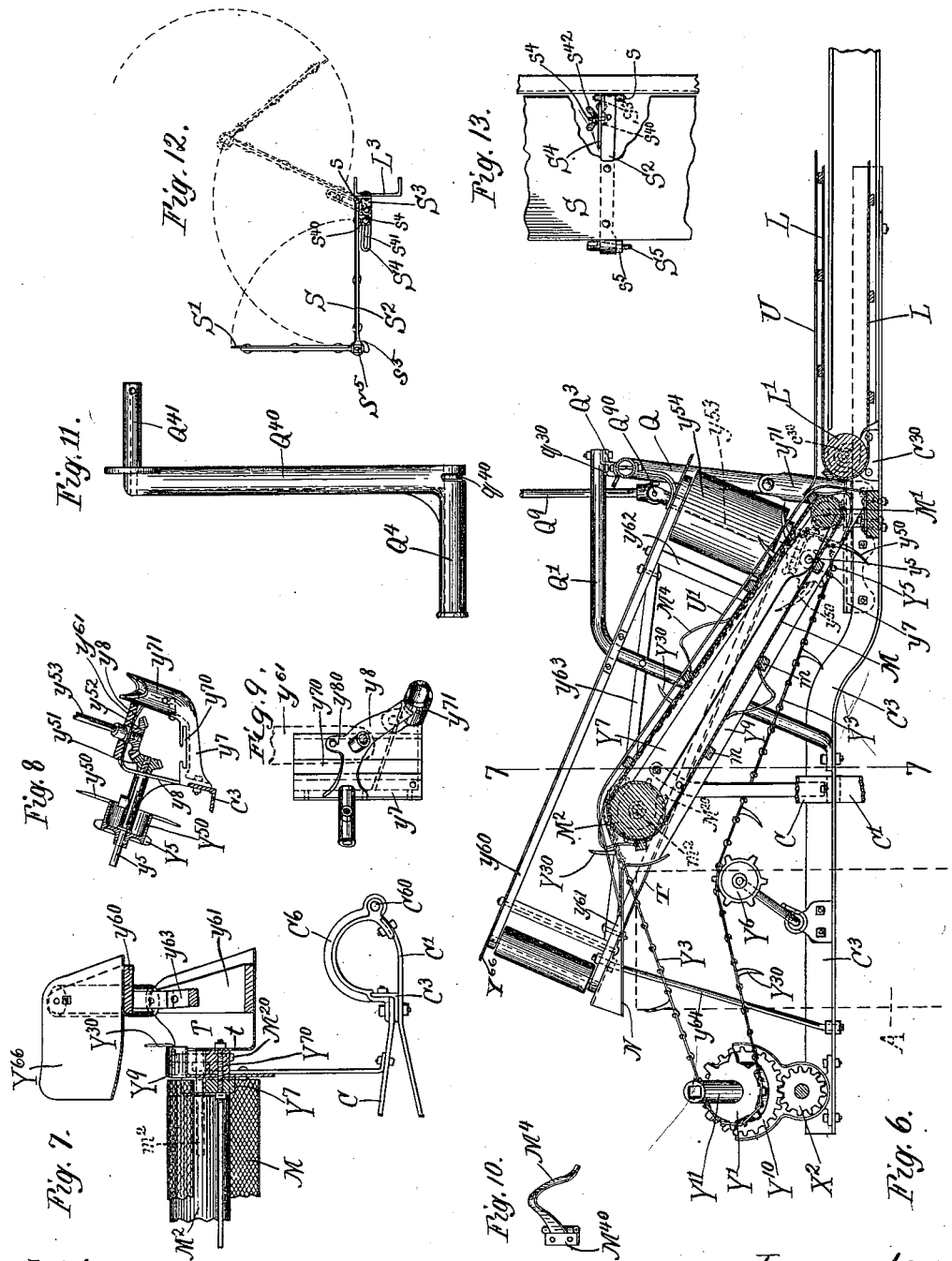
Witnesses
E. T. Wray.
Jean Elliott
Inventor.
Paul Hanson
By Burton and Burton
his attys (No Model.) 9 Sheets—Sheet 7.
P. HANSON.
HARVESTER.
No. 523,661. Patented July 31, 1894.
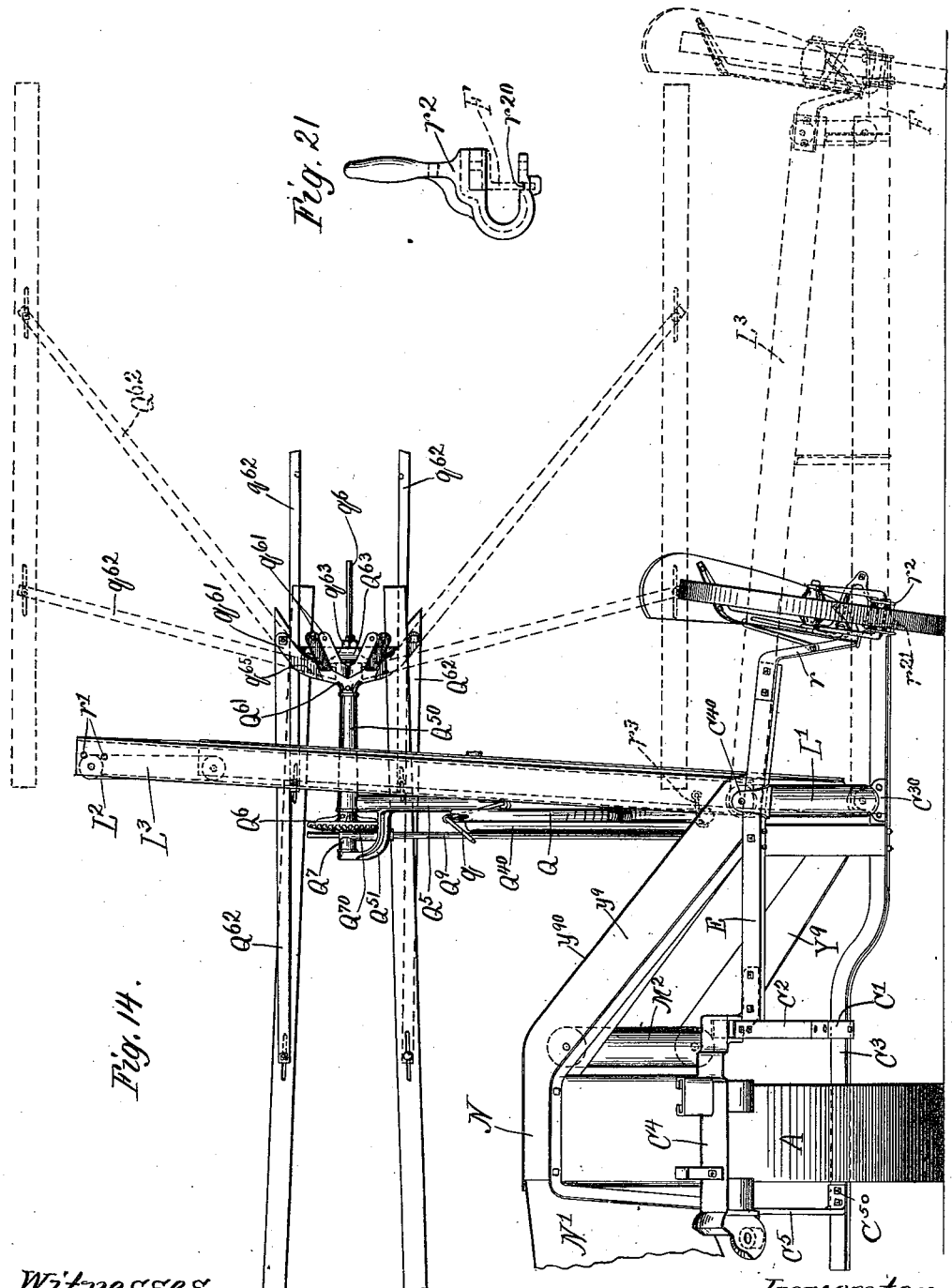
Witnesses.
E. T. Wray.
Jean Elliott.
Inventor.
Paul Hanson
By Burton and Burton
his attys.

(No Model.) 9 Sheets—Sheet 8.
P. HANSON.
HARVESTER.
No. 523,661. Patented July 31, 1894.
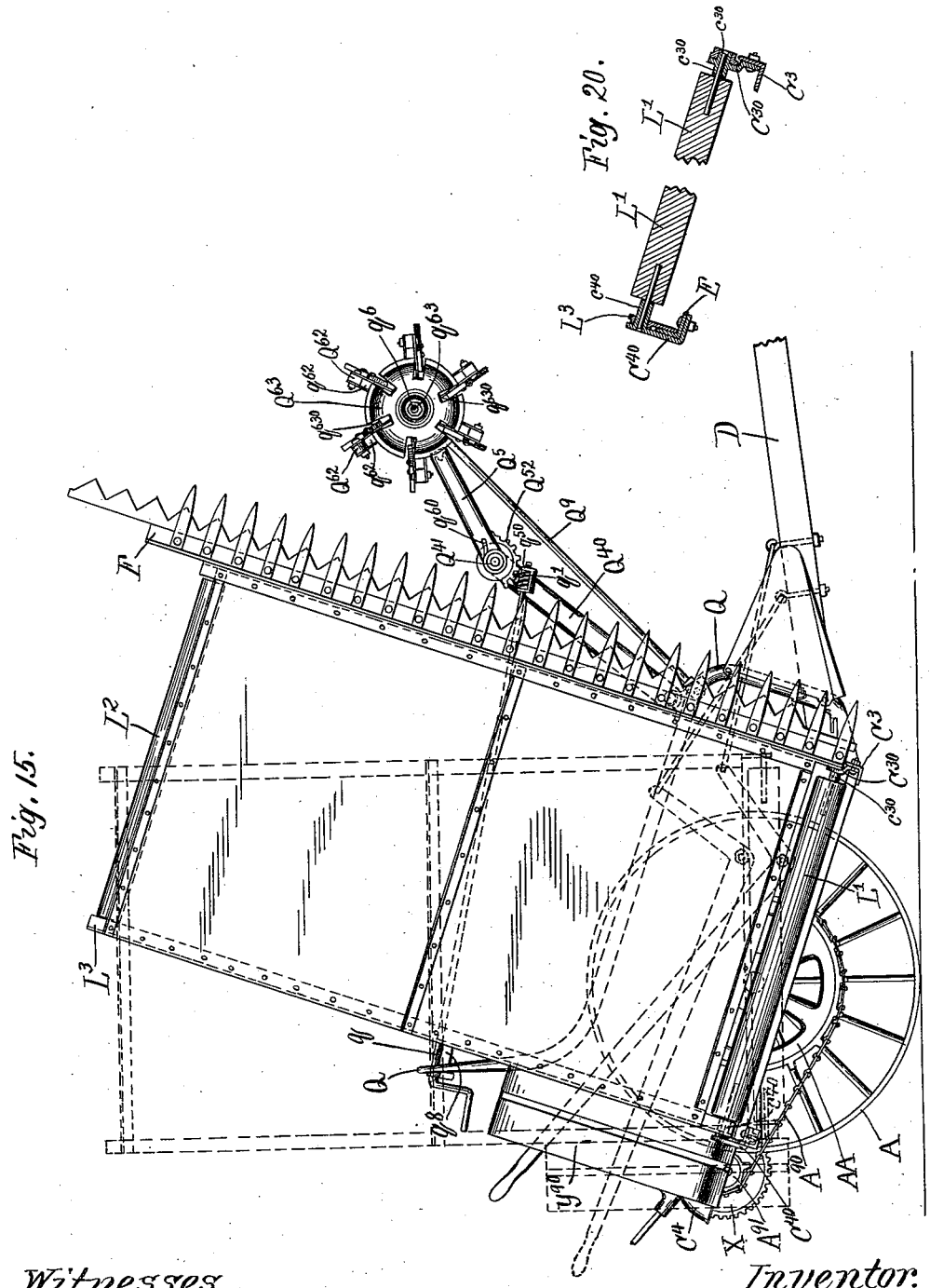
Witnesses.
E. T. Wray.
Jean Elliott
Inventor:
Paul Hanson
By Burton and Burton
his Attys (No Model.)  
9 Sheets—Sheet 9.

P. HANSON.
HARVESTER.

No. 523,661.  
Patented July 31, 1894.

Witnesses.  
E. T. Wray.  
Jean Elliott.

Inventor.  
Paul Hanson  
By Burton and Burton  
his attys

UNITED STATES PATENT OFFICE.

PAUL HANSON, OF CHICAGO, ILLINOIS.

HARVESTER.

SPECIFICATION forming part of Letters Patent No. 523,661, dated July 31, 1894.

Application filed October 31, 1892. Serial No. 450,593. (No model.)

*To all whom it may concern:*

Be it known that I, PAUL HANSON, a citizen of the United States, residing at Chicago, county of Cook, and State of Illinois, have invented certain new and useful Improvements in Harvesters, set forth in the following specification, reference being had to the accompanying drawings, forming part thereof.

This invention relates to harvesting machines in which the grain is carried transversely from the grainward side of the drive-wheel to the stubble-ward side, and bound at the stubble-ward side and delivered on to a sheaf-carrier, where enough sheaves may be accumulated to form a shock, and then dropped from the carrier to the ground.

It consists in improvements in the mechanism for carrying the grain from the point where it falls prostrate behind the sickle, toward and over the drive-wheel into the binder, and from the binder to the sheaf-carrier, said improvements consisting in general in gradually raising the grain from an approximately horizontal position, but somewhat inclined upward from butts to heads,—in which position it is received upon the platform-carrier,—to a position substantially upright, this being the position in which the bound sheaves are delivered on to the sheaf-carrier. The grain is thus tilted more and more upward at each succeeding stage of its stubble-ward movement, so that the passage over the wheel is made with the grain inclined quite steeply over the forward quarter of the wheel, requiring less elevation than if it passed horizontally over the top of the wheel and is bound still more nearly upright, the position tending to even the butts during binding; and the sheaves being delivered as described in an upright position on to the sheaf-carrier, enough sheaves may be accumulated to form a full shock; and, being accumulated against each other in an upright position they will tend to sustain each other as in shock, and, being dropped to the ground together, they tend to remain assembled in such upright position, as a completed shock, avoiding the necessity of gathering and stacking by hand to form the shock. Thus at each stage of the action an advantage is gained by the method of straightening up the grain as described.

The invention also comprises devices by which the weight and downward tendency of the machine also tend to operate as the means of holding the sheaf-carrier in sheaf-receiving position, avoiding the necessity for any spring for that purpose; and devices by which the same downward tendency of the weight of the machine, whether adjusted high or low, operates upon the tightener-wheel which takes up the slack of the main drive-chain, gaining an advantage which might be gained by a spring operating on the tightener,—avoiding the necessity of having the chain so tight as to increase the resistance of its operation, and yet dispensing with such a spring.

It also comprises means for folding up the machine laterally to allow it to pass through narrow gate-ways, or to be driven without inconvenience on ordinary roads, these devices involving improved means for folding up the platform carrier to an erect position, and for collapsing the reel arms to bring it within the same lateral compass as the rest of the machine when folded and collapsed, so that their lateral compass shall correspond to the width of road usually available for driving.

Figure 2:
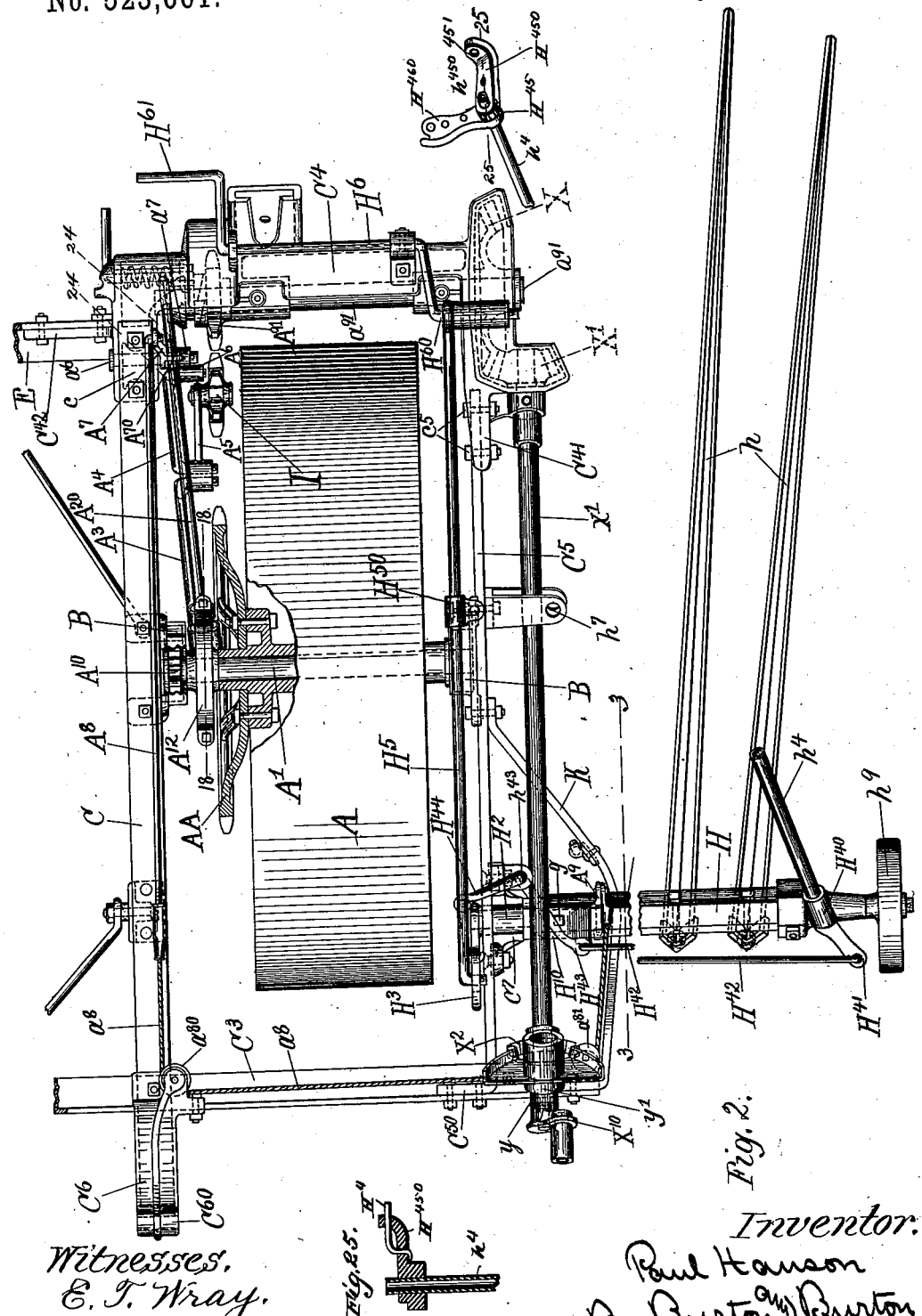
Figure 3:
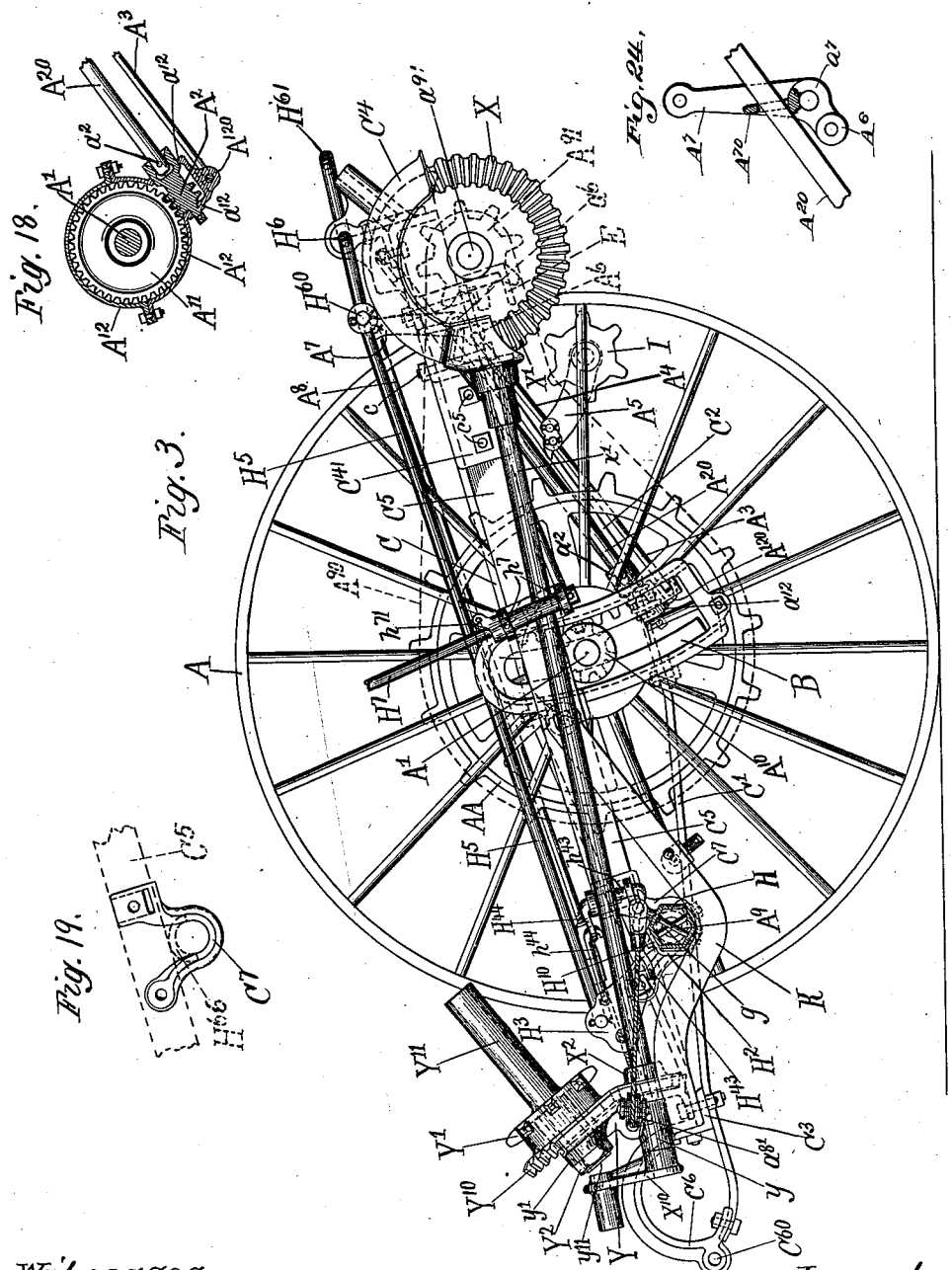
Figure 4:
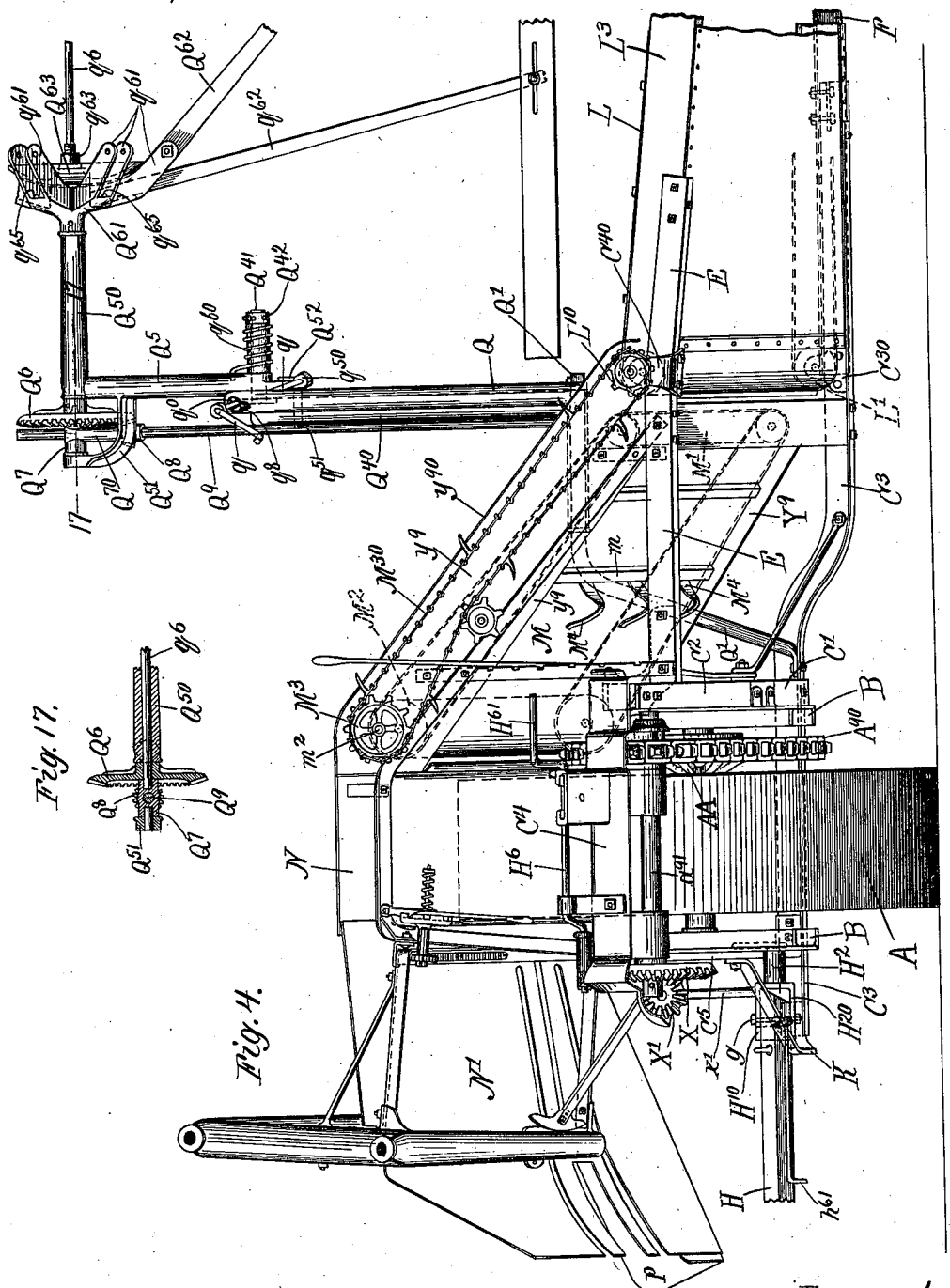
Figure 5:
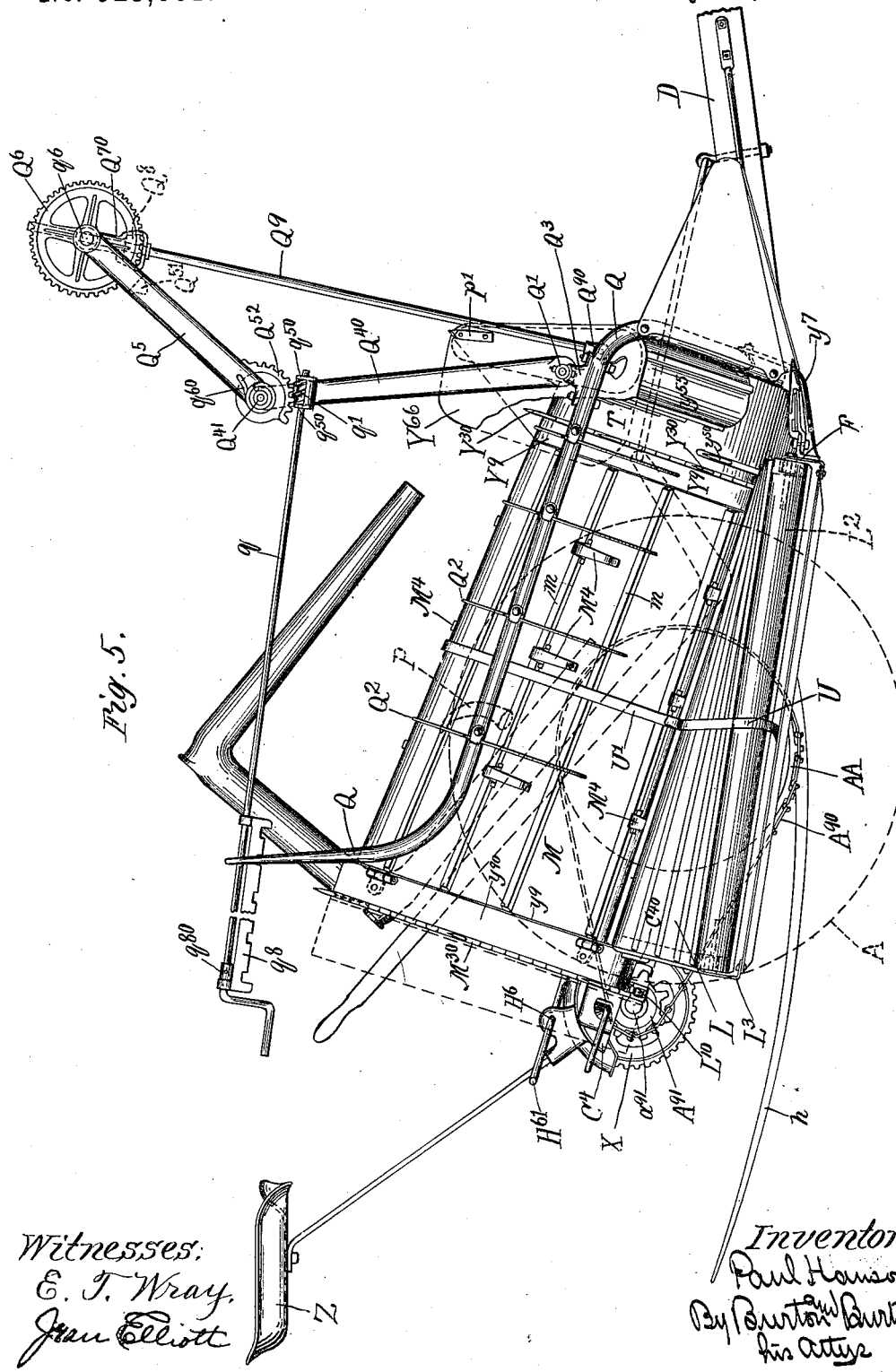
Figures 22, 23:
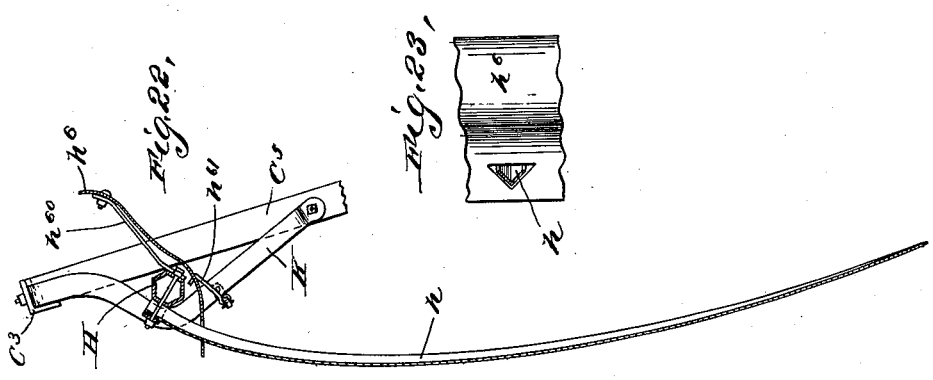
Figure 16:
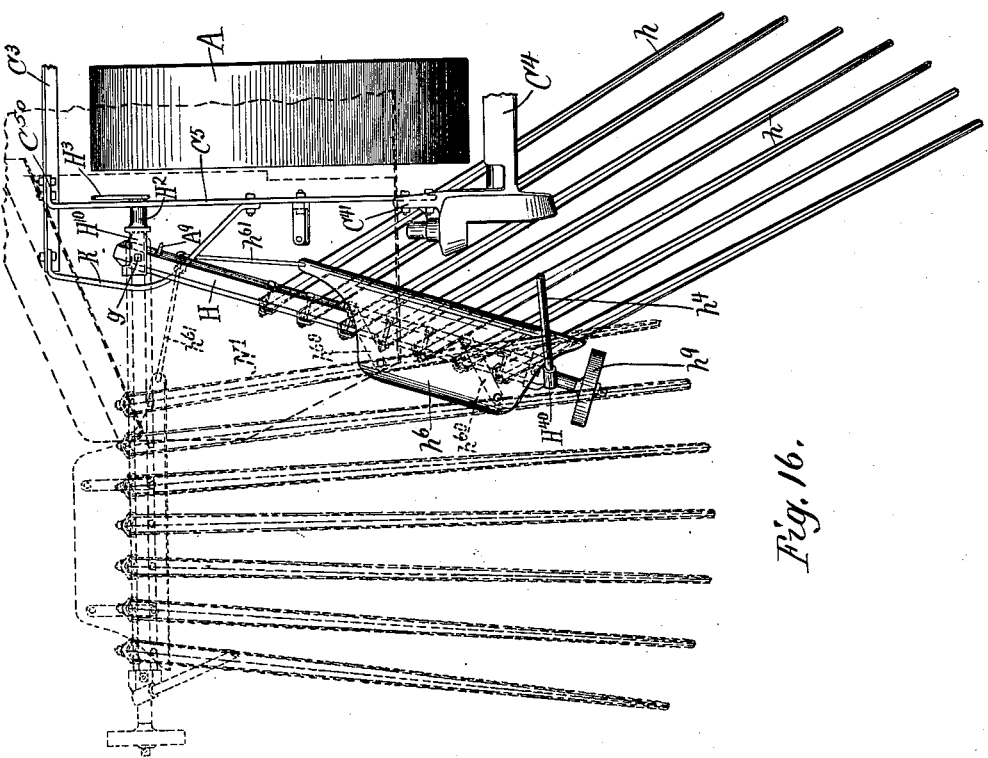

Figure 1 is a plan of my machine, the reel and binder mechanism being omitted but the binder frame and deck being shown, and the platform-carrier being broken away at the middle part and condensed laterally to save space. Fig. 2 is a plan of the main frame and portion of the sheaf-carrier, and parts of the driving train partly sectional at a horizontal plane through the main drive wheel axle, this figure being designed to show the raising and lowering and counterbalancing mechanism. Fig. 3 is a vertical section at the plane of the line 3—3 on Fig. 2, being therefore a stubble side elevation of the mechanism shown in Fig. 2, except the sheaf-carrier. Fig. 4 is a rear elevation of the mechanism shown in Fig. 1, except the sheaf-carrier, and with the addition of the reel. Fig. 5 is a grain side elevation, the divider and grain wheel being omitted. Fig. 6 is a section at rear elevation of the grain conveying mechanism, platform carrier and elevator, showing also a portion of the frame and butter, the platform-carrier and elevator being cut in planes at right angles to their respective grain-carrying surfaces. Fig. 7 is a sectional detail at the plane of the line 7—7 on Fig. 6. Fig. 8 is a detail section in the plane of the axes of the butter-driving shaft and its actuating shaft, designed to show the driving connection and brazings of said shafts. Fig. 9 is a plan of the bracket shown in Fig. 8, in which said shafts are journaled the lower bar of the butting apron being shown in dotted line above the portion of the bracket to which it is secured. Fig. 10 is a perspective of a trip-finger or ledge used to carry the grain on the elevator. Fig. 11 is an elevation of the reel post or lower member of the reel frame. Fig. 12 is a detail end elevation of an extensible back-board and wind-guard pertaining to the platform-carrier. Fig. 13 is a detail plan on one of the joints of this back-board. Fig. 14 is a rear elevation showing the frame stripped of most of the mechanism, and having the platform carrier tilted up and the reel collapsed for road travel. Fig. 15 is a grain side elevation of the same, except that the divider and grain wheel are omitted. Fig. 16 is a plan of the sheaf-carrier collapsed by swinging rearward, designed to illustrate its position relatively to the drive wheel and main frame, when thus situated. Fig. 17 is a section at the line 17—17 on Fig. 4. Fig. 18 is a detail section through the raising and lowering worm and worm-wheel case, at line 18—18 on Fig. 2. Fig. 19 is a detail elevation of a bearing or stirrup in the main frame for the sheaf-carrier trunk. Fig. 20 is a detail section axially through the journal bearings of the platform carrier driving roller, showing the mode of pivoting it to the main frame, at line 20—20 on Fig. 1. Fig. 21 is a detail grain-side elevation of a bracket at the grain end of the finger-bar forming part of the divider frame. Fig. 22 is a detail section at the line 22—22 on Fig. 1. Fig. 23 is a detail section at the line 23—23 on Fig. 1. Fig. 24 is a sectional elevation of a lever concerned in the vertical adjustments, section being made in a plane indicated by the line 24—24 on Fig. 2. Fig. 25 is a detail section at the line 25—25 on Fig. 2, showing the stubbleward bundle-supporting-arm in position.

A is the drive wheel. There is a rigid frame around the drive wheel to which the raising and lowering segments B, B are rigidly secured. This frame comprises at the grainward side a truss consisting of the upper flat bar C, the lower bar $C'C^2$, whose two oblique reaches $C'$ and $C^2$ extend respectively forward and rearward from the grainward segment to which it is secured, and which operates thus as a strut for the truss. The lower bar $C'C^2$ is made rigid with the straight upper bar by being fastened to the parts which constitute respectively the front and rear bars or sills of the wheel-frame. The front sill $C^3$ is an angle-iron to whose horizontal lip both the straight bar C and the oblique bar $C'$ are bolted, the former above and the latter below said horizontal lip, the same bolt securing both. The rear sill may be a cast-iron frame $C^4$, formed with suitable lugs for shaft-bearings, with gearing housings and with suitable lugs and flanges for the attachment of the fore-and-aft bars of the frame. To this casting $C^4$, at $c$, the upper flat bar of the truss which constitutes the grainward side of the frame is bolted, and the oblique reach $C^2$ of that truss is secured by the same bolts on the under side of the casting, suitable flanges having seats for the said bars of the truss being formed to receive the latter.

The stubbleward side of the wheel-frame is a flat bar $C^5$ set vertically edgewise, and bent at the forward end to form a foot $C^{50}$, which is bolted to the vertical lip of the front sill $C^3$, the rear end of said bar $C^5$ being bolted at $c^5 c^5$ to a suitable lug or flange $C^{41}$ extended forward from the frame $C^4$ for that purpose.

The bar $C'$ of the grainward truss extends forward to the front sill $C^3$, and the cast yoke or bow $C^6$ is secured to it and to the vertical flange of the said bar $C^3$, constituting a guard through which the sickle pitman may play, and having at its forward side the eye or pivot bearing $C^{60}$ adapted for the connection through it of the draft-pole or tongue D.

E is an angle-bar which is secured to the grainward end of the cast frame $C^4$, which is suitably formed to receive it, and which has a grainwardly extended lug $C^{42}$ to which said angle-bar E is bolted. Said bar constitutes a rear sill for the machine, which extends from the wheel-frame rigidly past the elevating mechanism, and which is adapted to afford means for securing the platform rear sill at a point grainward from said elevating mechanism.

The front sill $C^3$ is deflected downward after it crosses the grainward side of the wheel-frame, consisting of the truss described, and again deflected to a horizontal position at the lower level to which it is first deflected, and extends grainward a suitable distance to afford secure fastening to the finger bar F.

H is a hexagonal tubular bar which constitutes the trunk of the sheaf-carrier, which will be more particularly described hereinafter. This bar is pivotally connected at $g$ to the cast fitting $H^2$, between the lugs or flanges $H^{10}H^{20}$ of said fitting, so that it is adapted to swing in a plane substantially horizontal. Said fitting $H^2$ has at the grainward end the crank arm $H^3$, and between the crank arm and the lugs $H^{10}H^{20}$ it is round, adapted to operate as a shaft, and is journaled in the journal-box $C^7$ which is bolted to the bar $C^5$ of the wheel-frame on the outer or stubbleward side thereof, the said journal-box being upwardly open and constituting substantially a stirrup into which the fitting $H^2$ may be placed, the crank $H^3$, extending up on the grainward side of the bar $C^5$ and the fitting being stopped upwardly against the under edge of said bar. A cap or cover $H^{66}$ may be provided for the said journal box, but the use of this cover is optional, the fitting being stopped, as stated, against upward movement, by the bar $C^5$, whose under edge arrests such movement of the fitting. This fitting may be considered as a part of the trunk of the sheaf-carrier, and the entire trunk, together with the fitting, may be referred to as a rock-shaft.

K is a bar which constitutes a stirrup having special functions hereinafter explained, and which is secured rigidly to the wheel frame, being fastened to the bar $C^5$ by one of the bolts which secures the stubbleward segment to that bar, and being bent stubbleward and extending in a sloping direction downwardly from that fastening to a position underneath the bar H, when the latter is horizontal, at a distance of a foot or more from the bar $C^5$ and being there bent edgewise to form an angle in which the bar H lodges, and extending thence forward to the level of the front sill $C^3$, and then bent directly grainward and secured by being bolted to the vertical flange of said sill. The sheaf-carrier comprises rearwardly extended arms $h$ rigid with the trunk or rock-shaft H, and also certain other mechanism mounted on that trunk. The rearwardly extended arms of the sheaf-carrier support the sheaves, and their own weight and that of the load of sheaves tend to rock the trunk in its bearings. One feature of my invention consists in devices by which this rocking tendency is resisted and counterpoised by the weight of the machine, so that the carrier is thereby recovered and maintained in sheaf-receiving position elastically. I will now describe the mechanism which produces this result, and at the same time the means for raising and lowering the machine, and causing the weight and downward tendency of the machine to operate the tightener for the main driving chain.

$A'$ is the axle of the main driving wheel, on which said wheel is journaled and adapted to revolve. The axle has rigid with it the pinions $A^{10}$ $A^{10}$, which mesh with the segments in the usual manner, and it has also rigid with it the worm wheel $A^{11}$ incased in the two-part jacket $A^{12}$, which has the bearing $a^{12}$ $a^{12}$ for the worm $A^2$, which is journaled in said bearing and meshes with the worm-wheel. The worm is connected by a toggle joint at $a^2$ to its operating shaft $A^{20}$, which extends obliquely upward toward the rear and has its squared end protruding above the cast frame $C^4$, where a crank or key may be fitted to it to rotate it to raise and lower the frame in the segments in a well understood manner. The worm-wheel jacket $A^{12}$ has the lug $A^{120}$ projecting from the lugs which form the bearings $a^{12}$, and to this lug $A^{120}$ there is connected the link $A^3$, which, at the other end, is pivotally connected to one end of the crank arm $A^5$, which carries at the other end the tightener wheel I. To the same end of the arm $A^5$, and quite close to the pivot connection of the link $A^3$, the link $A^4$ is similarly connected, said link extending to the end of the short arm $A^6$ of the bell-crank lever $A^6$ $A^7$, which is fulcrumed at $a^7$ on a stud-bolt $a^6$, which projects rigidly from the grainward side of the wheel frame, being secured in the cast frame $C^4$ near the rear grainward corner of said frame.

The arm $A^7$ of the bell-crank lever has a web $A^{70}$, which has a vertically elongated aperture through which the shaft $A^{20}$ extends, said web serving thus to retain the shaft $A^{20}$ against displacement. To the upper end of the arm $A^7$ of the bell-crank lever $A^6$ $A^7$ there is pivotally connected the draft link or rod $A^8$, which extends forward directly above the truss bar C and at its forward end has connected to it the cable $a^8$, which extends around suitable guides $a^{80}$ and $a^{81}$ at the forward corners of the wheel-frame, and from the guide $a^{81}$ at the outer corner extends rearward, and by means of a suitable terminal clip is connected to the eye-bolt $A^9$, which is secured through the trunk H of the sheaf-carrier. Upon examination of the connection thus described from the worm-wheel jacket to the sheaf-carrier trunk, it will be seen that the weight of the machine, operating at the engagement of the segments with the pinions $A^{10}$ $A^{10}$ tending to rotate the axle $A'$ and the worm-wheel to cause the worm to travel around the axle carrying with it its bearings and the entire worm-wheel jacket, exerts a pull through the links $A^3$ and $A^4$, and the connection between them afforded by the tightener wheel arm $A^5$, upon the short arm $A^6$ of the bell-crank lever $A^6$ $A^7$ tending to rock the long arm rearward and exert a pull on the cable $a^8$ which would tend to rock the trunk G forward at the upper side; that is, in the direction to lift its rearwardly extended arms and the load thereon; or, to state the matter in the opposite order, the weight of the load upon the sheaf-carrier and the weight of the rearwardly projecting arms of the carrier exert a pull upon the cable, and through the draft-link $A^8$ a forward pull upon the arm $A^7$ of the bell-crank lever, giving a rearward movement to the arm $A^6$, which thus exerts a pull or a restraint upon the worm-wheel jacket against the tendency of the weight of the machine to rotate that jacket around the axle. Comparison of the leverages in this train of connection will show that the leverage is very greatly in favor of the lesser weight,—the sheaf-carrier and its load—and it is in fact so proportioned that the carrier and load will substantially counterbalance the weight of the whole machine, operating through the segments upon the axle. It will be observed that this relation is not materially affected by the raising and lowering of the machine produced by rotating the worm in engagement with the worm-wheel, and that the tilting of the carrier rearward to dump the load, by means which will be hereinafter explained, although such operation will be performed against the weight of the machine, will cause but a very slight and scarcely observable lifting of the machine.

The master-wheel A A is made rigid with the drive-wheel, and the main drive-chain A⁹⁰ extends from the master-wheel around the sprocket-wheel A⁹¹ on the main power-communicating shaft $a^{91}$, and its lower ply passes over the tightener wheel I. This chain is designed to be made only slack enough so that the tightener operating against it will take up the slack by the time it reaches the position shown in Fig. 3, with the pivotal connections of the two links A³ and A⁴ at a line with those links. Since the longitudinal stress between the bell-crank lever arm A⁶ and the worm-wheel jacket tends to pull the two links into line with each other, this stress tends to swing the wheel bearing arm end of the arm A⁵ upward, and thereby the weight of the machine besides counterbalancing the downward tendency of the sheaf-carrier and its load, operates with yielding stress upon the tightener wheel against the chain to take up its slack and keep it in proper operative relation to its sprocket wheels.

One leading feature of this machine is the arrangement and inclination of the various mechanisms by which the grain is conveyed sideward after being cut. The platform conveyer consists of an endless apron L, traveling around rollers L' and L², the former being at the stubbleward or wheelward end of the platform and constituting the driving roller for the apron, and the latter being at the grain end. The finger bar at the front and the sill L³ at the rear are made rigid in the customary manner to constitute a frame for the platform carrier, and afford support for the bearings of the two rollers. The finger-bar F extends horizontally, as usual. The grainward roller L² is inclined upward from front to rear at a slight angle, but the wheelward roller L' is inclined upward from front to rear at a much greater angle, the relative steepness of the platform at the two ends being seen in Fig. 5, and deducible by comparison of other figures. This requires that the rear sill L³ should be inclined upward from grainward to wheelward end, although the finger-bar is not so inclined, and the carrier apron, driven around the two rollers, accommodates itself to this difference of inclination of the rollers by being slightly twisted, the two rollers being in parallel vertical planes, and the difference in their inclination being not so great as to prevent the possibility of the accommodation of the apron thereto by such slight twisting as is not inconsistent with its running smoothly on the rollers.

The elevator or conveyer which carries the grain over the drive wheel, comprises the endless apron M, whose driving roller M', at the grainward and lower side, is substantially parallel with the stubbleward driving roller L' of the platform conveyer, having the same, or substantially the same, inclination from front to rear. The upper stubbleward roller M² of the elevator is, however, a little more steeply inclined than the grainward or lower roller of the elevator and the driving roller of the platform conveyer. There is, however, less difference in the inclination of the two elevator rollers than in the two platform conveyer rollers, and only slight twist is given to the elevator apron; but the inclination gained in the twist of the platform conveyer and continued through the elevator, causes the latter to be inclined at a considerable angle over the forward part of the drive wheel, so that the grain being carried over the wheel, does not have to pass over the highest point but over the forward portion, and with the butts extending quite low, although the heads project to a considerable height, being inclined from front to rear as they pass over the wheel. The decking or sheathing N above the wheel is horizontal from right to left, having, fore-and-aft, the inclination of the delivery side of the elevator, and it makes suitable junction with the binder deck N' at the stubbleward side of the wheel. This binder deck, at the rear edge, is but slightly inclined downward toward the stubbleward side, but at the forward end is very much inclined downward stubbleward, so that it has a very marked twist between the vertical planes of the binder frame at the stubbleward side, and the drive wheel at the grainward side. The mechanism is arranged to co-operate with the deck having this peculiar inclination and twist, and it will be understood that as a result, the grain which, having fallen on the platform conveyer with an inclination corresponding to the point of lodgment thereon, and carried grainward with a constantly increasing inclination while traveling to the top of the wheel, upon reaching the binder deck is rapidly brought toward an upright position as it moves stubbleward over that deck, the butts descending in their sideward movement while the heads are scarcely changed in elevation, and are near the level or above the level of the top of the wheel. The inclination of the binder deck from front to rear at a vertical plane of the binder frame, which may be treated as the position of the bundle during the binding operation, is about forty-five degrees. From this point outward, when the machine is tilted for ordinary cutting, the deck descends rapidly at the forward edge in a curve, so that the bundle as it moves over the deck in its discharge toward the sheaf carrier, if it should conform to the pitch of the deck, would almost reach an upright position by the time it reaches the outer edge of the deck. It being one purpose of this construction to cause the sheaves to lodge on the carrier in an upright position, this tendency of the shape of the deck is supplemented by an obstruction consisting of a horn-like post P, which protrudes upward with substantially the curvature shown in the drawings from a point stubbleward of the plane of the binder frame, and about where the sheaf will be in contact with it during binding. The discharge movement of the sheaf, communicated to it at a point forward of this obstruction, as by any discharge arm in the usual position, causes the sheaf to turn about this post P, so that it does, in fact, slide endwise, butts downward, off the deck; and lodges upright on the carrier. This construction of the carriers and decks, constituting the track of the grain from grainward to stubbleward side of the machine, may be employed with great variety of grain-actuating and binding mechanisms; and I do not limit myself to any particular mechanisms to be associated with the conveying and supporting parts, which have, and give to the grain, the changing inclination described. Nor do I limit myself to using such a succession of parts with successively increasing inclination, in combination with a sheaf carrier, because, without the latter, the sheaf might be lodged upright on the ground, which is, of itself, desirable. I have, however, in this machine, associated with the original features of construction, respecting inclination of the grain above described, certain specific mechanism for moving the grain, and certain specific actuating mechanisms which I consider desirable, which I will now describe.

Power is transmitted from the master-wheel A A to the main power-communicating shaft $a^{91}$, as already described. At the stubbleward end of the shaft $a^{91}$, the beveled gear X, which is fast on the shaft, meshes with the beveled pinion X′ on the shaft $x'$, which extends in oblique direction downward to the forward end of the frame, where it is suitably journaled in the bearing $y$ in the bracket Y, secured to the wheel frame at the forward outer corner. And at the end in front of said bearing, it has the sickle-driving crank $X^{10}$. Behind the bearing, there is, rigid with it, the beveled gear $X^2$, which meshes with the beveled gear rim $Y^{10}$, formed integrally with the sprocket wheel Y′, which has, projecting at the rear, a long tubular hub $Y^{11}$, whose aperture may be made square, and at the forward end, the short hub $y^{11}$, by which it is journaled in the same bracket Y at the bearing $y'$, being retained in said bearing by the nut or burr $Y^2$, which is screwed onto the end of the hub $y^{11}$. This wheel Y′ serves to communicate power to the binder by means of its hub $Y^{11}$, within which the prime driving shaft of the binding mechanism is designed to telescope (to permit fore-and-aft adjustment of the binder); and by means of its sprocket rim, it communicates power also to the several conveying, elevating and butt-adjusting mechanisms, which are hereinafter described. The chain $Y^3$, passing around this sprocket wheel, encompasses also the sprocket wheel $M^{20}$ at the forward end of the shaft $m^2$ of the upper roller $M^2$ of the elevator apron, said shaft $m^2$ being suitably journaled in the side-bars of the elevator frame, which is not specifically described because of a familiar construction. Said chain also encompasses in its course the sprocket wheel $Y^5$, which is secured to the rear end of the short shaft $y^5$, journaled as hereinafter described. The sprocket wheel $Y^5$ has formed as a part of it a cylindrical web $Y^{50}$, extending forward and overhanging the bearing of its shaft, and provided with radially projecting teeth or fingers $y^{50}$, whereby it is adapted to operate as a clearing wheel at the forward end of the elevator, as will be hereinafter more particularly described. $Y^6$ is a tightener sprocket wheel, over which said chain $Y^3$ passes on its return ply from the sprocket wheel $Y^5$ to the driving sprocket wheel Y′. Further details of the butting mechanism, including the clearing wheel $Y^5$ $Y^{50}$, will be hereinafter described. The shaft of the wheel $Y^5$ is located stubbleward from the lower elevator roller, and the wheel $Y^5$ is so located that the ply of the chain, encompassing it and extending between it and the preceding wheel $M^{20}$, runs substantially in the plane of the elevator apron, but forward of the lower forward edge of that apron, and said chain is armed with grain-carrying teeth $Y^{30}$, so that, in addition to its function of communicating power to the mechanism described and to be described, it constitutes an additional grain-carrying element operating upon the butts of the grain forward of the elevator apron for a specific purpose, and with an effect hereinafter described. The sprocket wheel $M^3$, at the rear end of the shaft $m^2$ of the upper and driving roller of the elevator communicates power through the chain $M^{30}$, which encompasses it, to the sprocket wheel $L^{10}$, which is secured to the rear end of the shaft of the stubbleward and driving roller of the platform conveyer, and said sprocket wheel is so located that the upper ply of the chain $M^{30}$, extending between it and the preceding sprocket wheel $M^3$, lies approximately in, but slightly above, the plane of the elevator apron, and at the rear thereof; and, in addition to its function of communicating power as described, constitutes an additional grain-carrying element operating upon the heads of the grain which may overhang the elevator at the rear. The chains $Y^3$ and $M^{30}$ are each shielded from the grain to prevent it from becoming entangled with the chains and carried around the sprocket wheels. The shield for the forward chain $Y^3$ consists of the sheet metal $Y^9$, folded to form a right angle, and having a vertical portion clamped between two bars $Y^7$ and $Y^{70}$, which together constitute the side-bar of the elevator frame and a horizontal flange overhanging the chain $Y^3$ and its driving sprocket wheel.

The shield of the chain $M^{30}$ consists of the plate or sheet $y^9$, fastened to the rear elevator side-bar, and extending up at the rear margin of the elevator apron, and having, hinged to it, the cover piece $y^{90}$, which overhangs the chain $M^{30}$, and the wheels upon which it runs. This guard is extended stubbleward onto the deck which covers the drive wheel, and the cover $y^{90}$ extends grainward, curving around the sprocket wheel $L^{10}$ at the rear of the platform carrier, where it is overhung by the head and extension board S, so that long grain, which overhangs the platform carrier and rests upon the head board, will be guided up onto this cover and properly engaged by the chain, as designed. It will be understood that the cover $y^{90}$ is slotted for the carrying teeth of the chain $M^{30}$. The carrying teeth of both these chains are set off sideward from the chains respectively, and those of the forward chain $Y^3$ thus travel in front of the forward edge of the shield $Y^9$.

I employ a peculiar form of carrying knee or shelf on the elevator apron, consisting of a bent piece of metal $M^4$, which, in the particular form illustrated, constitutes the strap or tongue of a construction closely resembling a common single-strap hinge, of which the butt or plate $M^{40}$, is secured to the ribs or slats $m$ of the elevator apron, being inserted between the slats and the canvas, so that the edge of the slat constitutes a stop to limit the folding of the strap back toward the slat, the strap $M^4$ being bent up between the butt and its point, so that the point rests upon the canvas when the strap is folded back as far as the slat will permit. These fingers or grain-carrying shelves are adapted, as will be understood from the drawings, to conform approximately to the curvature of the rollers as the apron passes around the latter, the angle of the bent strap or finger receiving the roller, so that the effect is substantially the same as if it were a trip finger adapted to fold, and strip in folding, when passing over the roller. I thus obtain the benefit of such a mechanism without devices for tripping the finger.

U is a strap which is secured to a fore-and-aft bar of the conveyer frame near the grainward end, and which is bent up about that end of the platform conveyer and lies upon the top of the latter, extending across to the stubbleward or delivery side, and across the throat between the conveyer and elevator at the delivery side of the former, and lapping onto a similar strap U′, which is secured in a similar manner to a cross-bar of the elevator frame underneath the apron, and folds up around the receiving side of the latter, and, lying close upon it, extends to the upper delivery side and across the throat between the same and the deck over the wheel, and laps onto said deck. Any desired number of such straps may be employed on the platform conveyer and on the elevator, and their function is chiefly to support the grain in passing over the throats at the ends of the elevator and conveyer respectively, and to strip it off the carrying fingers where such are employed.

The mechanism for actuating the butts of the grain will now be described, and first, it will be noticed that forward of the elevator and of the shield which guards the chain $Y^3$ at the forward end of the elevator, there is a narrow deck T, which, as represented, is made as a continuation of the sheet metal constituting the deck over the drive wheel, though its integrality with that deck is not material. This deck extends from the deck N over the drive wheel at an inclination less than that of the elevator to a point substantially at the level of the upper or carrying surface of the elevator apron at its receiving side; and from this relation, it results that the said deck T is lower than the carrying surface of the elevator through almost its entire extent, but reaches the level of that surface at about the point where the grain first lodged against the elevator apron. A step with a tapering "riser" is formed forward of the elevator, and on the "tread" (which is the deck T) of this step the butting apron $y^{55}$ stands and travels. The deck T is slotted to permit the teeth $y^{50}$ of the clearing wheel $Y^5$ $Y^{50}$ to operate through it to clear the corner between the elevator and the butter at the grainward end of the latter, and said deck is curved downward grainward of that clearing wheel, and terminates at its grainward edge substantially at the level of the axis of the conveyer driving roller, so that it affords a slight pocket into which the butts may drop in order to be more certainly engaged by the teeth of the clearing wheel to prevent detention at that point. Onto the top of the butter frame, I secure the shield $Y^{66}$, which extends rearward, overhanging the deck T and the forward side of the elevator carrier. The purpose of this shield is to retain the butts when, as is frequently the case, they are filled with dry leaves and grass and rendered bulky and fluffy and liable to escape above the butter and so slide forward off the machine. Such action is positively prevented by the shield. The butting apron is driven by the beveled gear $y^{51}$ at the forward end of the shaft $y^5$, which meshes with the beveled gear $y^{52}$, which is fixed on the shaft $y^{53}$ of the lower roller $y^{54}$ of the butting apron $y^{55}$. The frame for this apron, consisting of the upper and lower bars $y^{60}$ and $y^{61}$, respectively, and the braces $y^{62}$, and $y^{63}$ needs no further description. It stands upon the deck T above described, not in the sense that the deck supports the butter frame but that the latter rests immediately above the former, both being supported as hereinafter described. The riser (as it has been, by reason of analogy, termed), $t$ of the step whose tread is the deck T, is made fast to the forward side of the forward piece $Y^{70}$ of the forward elevator side bar, which thereby, to some extent, becomes the support for said deck; and the tread or deck T may be nailed fast to the lower bar $y^{61}$ of the butter frame. The chief support, however, of the butter and said deck T, is obtained upon the parts which will now be described.

$y^7$ is a bracket which is bolted fast to the forward sill $C^3$, stubbleward from the stubbleward end of the finger bar. It has a seat and guard for the sickle which plays through it at $y^{70}$, and it affords the immediate support for the bracket $y^8$, which has the bearings for the shafts of the two beveled gears $y^{51}$ and $y^{52}$, or said brackets $y^7$ and $y^8$ may be formed integrally. The lower bar $y^{61}$ of the butter frame is secured at its inner or grainward end to the bracket $y^8$, a small lug $y^{80}$ being provided to facilitate such fastening. The butter frame and the deck T under it, being thus supported at one end, are further supported at the other end, by the brace rod $y^{64}$, which extends from the front sill up to the stubbleward end of the lower bar $y^{61}$. This butter frame is further stiffened and braced in position by a tubular arm or bar Q', as hereinafter described.

The elevator is designed to be entirely open rearward. To this end, there is secured in the socket $y^{71}$ of the bracket $y^7$, a bar or tubular arm Q. Said arm extends upward with the forward inclination of the socket $y^{71}$ to the top of the butter, and is then bent rearwardly over or past the grainward end of the butter, extending in a direction approximately parallel with the delivery roller of the platform conveyer, which it overhangs to a distance nearly equal to the width of the elevator, and is then bent upward, making an obtuse angle with its rearward course, and at its upper end serves to support the shaft which operates the reel-adjusting devices, as hereinafter explained. To the rearwardly extending portion of this bar or tubular arm are secured the spring rods $Q^2$ $Q^2$, &c. These rods are bent down from their point of fastening at the tubular arm Q, and then stubbleward and upward, following the inclination of the elevator apron to the top of the latter, and thence over onto the deck N above the wheel. These spring rods serve to check and restrain the grain on the elevator, and keep it within control of the apron and particularly of the carrying shelves or fingers described. In order to stiffen the arm Q in the position in which it is located, as well as to stiffen and brace the butter in its position, I provide the bar or tubular arm Q', flattened to form a foot, by which it is secured to the front sill near the drive wheel, and bent thence upward obliquely grainward through both upper and lower bars of the butter frame, which it penetrates nearly at right angles thereto, and, after it emerges above said frame, bent horizontally grainward and extending across the arm Q above the latter. For the purpose of securing these arms Q and Q' together where they cross, I provide the pillow block $Q^3$, which has a downwardly concave seat on the under side to fit the arm Q, and an upwardly concave seat transverse to the former at the upper side to fit the arm Q'. Said arms being both bolted to said pillow block are thereby made rigid with each other. The point of crossing and fastening of these two arms, being rearward of the line of the socketed connection of the arm Q with the bracket $y^7$, prevents said arm from turning in the socket, and produces the requisite stiffness. The reel frame is supported by the arms Q and Q' thus rigidly united, the arm Q' serving as the pivot upon which the frame rocks. This rocking reel frame has the horizontal sleeve or hub $Q^4$, which fits outside of the horizontal portion of the arm Q', and is placed upon the latter before it is bolted to the pillow block $Q^3$. The said pillow block has a depression in its concave seat mentioned adapted to receive the hub or sleeve $Q^4$, and at the margin of the block, there is formed a rabbet or rib $q^{80}$ in said concave seat, corresponding to the groove $q^{40}$, near the end of the sleeve or hub $Q^4$ of the reel frame, so that when the reel frame has been passed onto the arm Q' to the proper point, and said arm and frame are seated on the pillow block, the said rabbet on the latter enters the groove on the former, and retains the reel frame against displacement longitudinally with respect to the sleeve while permitting it to rock fore-and-aft on the arm Q' and in the seat of the pillow block. At the opposite end of the tubular arm $Q^{40}$ of the reel frame from the hub of the sleeve $Q^4$, and projecting toward the opposite side from said hub, said frame has the rigid stud-bearing $Q^{41}$, on which the reel-bearing frame $Q^5$ is pivoted. This reel-bearing frame $Q^5$ has the tubular arm $Q^{50}$, in which the reel shaft $q^6$ is journaled, and the yoke or bracket arm $Q^{51}$, which terminates in a short bearing in line with the bearing $Q^{50}$, leaving an interval between the two in which there is located the beveled gear $Q^6$, rigid on the reel shaft at the opposite end from the reel head, and the swinging bracket $Q^7$, which is pivoted on the end of the reel shaft and on a stud projecting into it from the end of the bracket arm $Q^{51}$. This swinging bracket has the sleeve $Q^{70}$ at right angles to the reel shaft, and at the lower end of that arm is formed a yoke in which is journaled the beveled pinion $Q^8$, which is thereby held in mesh with the beveled gear $Q^6$, and drives the latter, being itself driven by the reel-driving shaft $Q^9$, which extends through the hub of the pinion and drives it by a feathered connection therewith, and extends thence on through the sleeve $Q^{70}$, being thereby adapted to telescope through the pinion and sleeve while continuing to drive the former and thereby the reel at all positions. The reel driving shaft $Q^9$, at its lower end, is connected by a universal joint $Q^{90}$, with the upper end of the shaft $y^{53}$ of the butter driving roller, and receives power through that medium. The reel bearing frame $Q^5$, being pivoted, as stated, on the stud $Q^{41}$ of the fore-and-aft rocking frame $Q^4$ $Q^{40}$, is adjusted by rocking over that pivot to raise and lower the reel, being adjusted fore and aft by rocking the frame $Q^4$ $Q^{40}$ over its pivotal support upon the arm Q'. Both these adjustments are effected by means of the shaft $q$. This shaft is journaled in two lugs, $q^{50}$ $q^{50}$, formed on a swiveled yoke which has a spindle $q^{51}$, by which it is pivoted on the reel post. The frame $Q^5$ has a flange which constitutes a worm segment $Q^{52}$, concentric with the pivotal axis of said reel bearing frame, and the shaft $q$ has rigid on it, between the lugs $q^{50}$, a worm $q'$, which meshes with said gear segment, and, by rotation of the shaft, tends to rock the reel-bearing frame over its pivotal support on the stud $Q^{41}$. A spring $q^{60}$ is coiled about the hub of the frame $Q^5$ on the stud $Q^{41}$, having one end stopped against said frame, and the other end made fast to a collar $Q^{42}$ secured on the projecting end of the stud $Q^{41}$, and coiled in such direction that it tends to elastically support the reel, and of such tension as to approximately counterbalance the reel at ordinary positions, and thereby, to relieve the strain upon the worm and worm gear in adjusting and sustaining the reel.

The fore-and-aft adjustment of the reel, effected by rocking the frame $Q^4 Q^{40}$, is performed by sliding the shaft $q$ in a bearing which is provided for it at the upper end of the arm Q, said arm being flattened as shown, and provided with a slot $q^0$, through which the shaft $q$ extends, said shaft having hung upon it the notched bar $q^8$, stopped against longitudinal movement on the shaft by a stop collar $q^{80}$, the slot $q^0$ being of sufficient extent to permit the shaft $q$, with the notched bar thereon, to be lifted sufficiently to disengage the notches from the lower edge of the slot, while the shaft and notched bar are moved longitudinally to adjust the reel fore-and-aft. The weight of the shaft $q$ and of the reel transmitted to the shaft through the segment $Q^{52}$ on the worm $q'$, is calculated to be sufficient to securely retain the notched bar in engagement with the lower edge of the notch in the arm Q, and secure the reel as adjusted fore-and-aft. The crank handle at the rear end of the shaft $q$ serves to operate said shaft in both its horizontal and longitudinal movement for the purpose of the two adjustments described.

One of the distinguishing features of this invention is the facility which its construction affords for reducing the lateral compass for the purpose of transportation over wagon roads, and to enable it to pass through gateways. This facility is attained by devices in the construction of the platform carrier which permit said carrier to be folded and stand upright, and by devices in the construction of the reel, which permit it to be collapsed and extend its arms stubbleward from the reel head or spider, instead of grainward, when in operation.

I will first describe the construction which adapts the platform carrier to be folded to upright position. Two features are embodied in this operation: first, the detachability of the grain wheel frame and divider bodily from the platform carrier, and its attachability to the grain ends of the main sills, which are independent of the carrier frame; second, the construction of the platform carrier which consists in making its frame independent of the main harvester frame, and pivoting it to the latter at the axial line of the conveyer driving roller. The first feature, detachability of the grain wheel frame and the divider from the platform carrier, is effected by providing the grain wheel and divider frame with a bar $r$, which extends to the rear sill or bar of the platform carrier frame, and is adapted to be bolted therethrough at $r'$, and providing the casting $r^2$, which constitutes the central or uniting element of the grain wheel frame with a seat at $r^{20}$, adapted to receive the end of the angle-iron F, which constitutes the finger-bar, and equally adapted to receive the angle-iron $C^3$, which constitutes the front sill, and providing for securing either of said bars rigidly in relation to said frame $r^2$, by means of a bolt, as $r^{21}$, which is removable readily when the change of connection is to be made. To the front and rear sills of the main frame, there are secured brackets $C^{30}$ and $C^{40}$, respectively. Said brackets have bosses $c^{30}$ and $c^{40}$, respectively, projecting toward each other and in line, which constitute trunnions on which the platform frame pivots, the finger bar and rear sill being respectively provided with suitable bearings to fit said trunnions. These bosses are bored through and constitute also the journal bearings for the driving roller of the conveyer. Thus, while the platform conveyer frame is pivoted concentrically with the shaft of the driving roller of the conveyer, that shaft is relieved from all the friction which would result from pivoting upon it. When the platform frame is thrown down to operating position, its sills lodge upon the horizontal flanges of the angle-iron sills $C^3$ and E of the main frame, and may be secured in that position by any convenient disengageable fastening, as a bolt or hook.

When the machine is to be transported over the road, the grain wheel frame being detached from the platform conveyer frame, the latter will be tilted up to upright position shown in Fig. 14 and hooked to the bar Q to retain it in that position (the hook $r^3$ being provided for that purpose), and the divider and grain wheel frame will then be reattached to the machine by being fastened to the protruding ends of the main frame sills in the same manner as it was attached to the ends of the conveyer platform sills when the latter was in operative position.

To facilitate the same purpose of lateral condensation of the machine, the reel is made collapsible by the peculiar construction of the spider or head $Q^{61}$, and the arms $Q^{62}$ $q^{62}$ support the bats. This spider or head has the several pairs of parallel lugs or flanges $q^{61}$, between which the bat arms $Q^{62}$ $q^{62}$ are secured, said lugs projecting grainward while diverging radially. The bat arms $Q^{62}$ are fastened in position between the lugs of the spider by bolts which pass through the two lugs of each pair and the bat arm between them. The inner end of these bat arms $Q^{62}$ is beveled off to correspond to the direction of the arm $q^{62}$, for which space remains between the lugs inward from the beveled ends of the arms $Q^{62}$, so that when both arms are in place, as shown in Fig. 4, the space is closely occupied. To prevent the arm $q^{62}$ from being longitudinally removable from that position, the spider has the small projection $q^{65}$, protruding into the space which constitutes the seat for the arm $q^{62}$, and said arm has a notch adapted to receive said projection. For the purpose of retaining the two arms $Q^{62}$ and $q^{62}$ in the position in the spider necessary to cause them to diverge to form the two supports which they are intended to afford to the bat, I provide the disk $Q^{63}$, lodged on the end of the reel shaft which protrudes from the spider at the hub, and the end of that shaft being threaded, the disk $Q^{63}$ is adapted to be secured and retained on the shaft by a nut $q^{63}$. This disk being forced close up against the hub of the spider after the arms are in the position necessary to hold the reel expanded, as seen in Fig. 4, and being fastened in that position by the nut $q^{63}$, holds the beveled ends of the arms $Q^{62}$ close back against the grainward edges of the arms $q^{62}$, which are thus forced close home into their seats in the spider, and are engaged with the projection $q^{65}$, preventing longitudinal displacement. To permit the reel to be collapsed, the nut $q^{63}$ being slackened, the disk $Q^{63}$ will be moved toward the end of the shaft sufficiently to permit the arms $Q^{62}$ and $q^{62}$ to be swung far enough to disengage the arm $q^{62}$ from the projection $q^{65}$, and the ends of both said arms $q^{62}$ and $Q^{62}$ to be passed over the edge of the disk $Q^{63}$, to the inner or grainward side thereof, and then, the bats being pushed stubbleward, the arms $Q^{62}$ pivoting on the bolts which fasten them to the spider, and the arms $q^{62}$ sliding in whatever direction and whatever distance is necessary in order to permit the bats to come to a position as near as possible to the reel shaft, and to a position as nearly parallel as possible, the disk $Q^{63}$ will then be removed up to the hub of the spider again, and secured by its nut $q^{63}$, and in that position will serve to retain the arms and bats of the reel in the collapsed position shown in Fig. 14 in which position, it will be seen, the bats extend stubbleward instead of grainward from the spider. The disk $Q^{63}$ may have the notches $q^{630}$ for either the bats or the arms to pass through while the disk is moved up if it should be inconvenient to collapse the reel enough to permit the disk to enter otherwise between the ends of said arms and bats, and the disk being rotated the width of the notches after it is back against the hub of the spider will bind against the edges of the arms as perfectly as if it were not notched.

I will now describe the construction and operation of the sheaf-carrier and shocking device.

As already described, the sheaf-carrier consists of the trunk H, which, with its appendages, constitutes substantially a rock shaft adapted to rock upon an axis at right angles to the direction of travel on the main frame and sheaf-carrier arms $h$, which extend rearwardly therefrom. It comprises, further, means for upholding the sheaves which are dropped endwise onto this carrier, and keeping them in the upright position in which they are thus deposited while a sufficient number of sheaves to constitute a shock is accumulated on the carrier. The devices for keeping the sheaves upright, and retaining them on the carrier until it is desired to dump the load, include two sets of horizontally extending arms. The first set are the arms $H^4 H^4$, which are attached to the upright shaft $h^4$, which is journaled in the bearing $H^{40}$ near the stubbleward end of the trunk H. This bearing is not vertical but inclined grainward and rearward when the sheaf carrier is in sheaf-receiving position. The shaft $h^4$ has a crank arm $H^{41}$ below its bearing $H^{40}$, and a link $H^{42}$ extends to said crank arm from the arm $H^{43}$ of the vertical rock shaft $h^{48}$, which is journaled on the wheel frame and has the crank arm $H^{44}$ projecting in a plane nearly at right angles to that of the arm $H^{43}$, and connected by a link $h^{44}$ to the lever arm $H^3$ of the trunk H. Said lever arm is also connected by the link $H^5$ to the arm $H^{60}$ of the rock shaft $H^6$, which is journaled on the wheel frame at the rear end and has the foot $H^{61}$ at the opposite end in position to be operated by the foot of the driver to tilt the carrier down to dump its load. The position of the cranks of the rock-shaft $H^6$, when the carrier is in sheaf-receiving position, that is, not tilted down, is substantially parallel with the link $H^5$, so that the rearward thrust of the link $H^5$, due to the weight of the carrier and its load, is almost directly toward the shaft, and very slight pressure of the foot downward upon the crank wrist to which the link is connected, or upward upon the other crank wrist, will suffice to prevent the weight of the carrier's load, however great, from rocking the shaft or causing the carrier to dump, and practically, the carrier may be said to be locked by the crank arm $H^{60}$ of the shaft $H^6$, so that it cannot dump until that shaft is rocked a little to carry the crank and link $H^5$ out of line. It will be seen that the movement of the crank arm $H^3$ caused by this dumping movement, is such as to rock the shaft $h^4$ in a position to swing the arms $H^4$ outward and stubbleward which is the movement desired in order to permit the shock of sheaves, which may have been accumulated on the carrier, to pass out rearward, or rather, to permit the carrier to withdraw forward from under them as the machine advances. The arms $H^4$ are spring arms and are connected to the shaft $h^4$ by means of the cast sleeves or hubs $H^{45}$, having lever arms $H^{450}$, provided with the eyes $h^{450}$, through which the spring arms $H^4$ are inserted, and then bent down through the eyes $h^{451}$ in said lever arms. These same hubs or sleeves $H^{45}$ serve to secure also the sheaf-ejecting arms $H^{46}$. These arms are also made of rod or wires, suitably secured in the lever arms H⁴⁶⁰ of said sleeves or hubs. The rocking of the shaft h⁴, as described, therefore, not only swings aside the arm H⁴ to permit the shock to depart, but also brings the dischargers in behind the sheaves, and forces them positively some portion of the distance. The form of these discharging arms adapts them to a specific function hereinafter described. To the same hubs or sleeves H⁴⁵ there are secured spring arms H⁴⁷, which are coiled about the shaft h⁴ to give them resiliency, and extend obliquely grainward over the carrier arms when the carrier is in sheaf-receiving position. These spring arms are near enough to the discharge side of the binder so that they will support a single sheaf discharged onto the carrier and retain it upright until other sheaves are lodged beside it, and they will yield stubbleward and rearward as the sheaves are accumulated, and will thus permit the entire sheaf-receiving space to be occupied without permitting any sheaves to fall prostrate.

The second of the means for retaining the sheaves on the carrier consists of an upright rock shaft H⁷, which is pivoted on the main frame at h⁷, and has arms H⁷⁰ extending from it stubbleward across the carrier. These arms may be curved so that the portion which overhangs the carrier is approximately in the path of the ends of the spring arms H⁴⁷, as the latter are flexed rearward and stubbleward by the accumulation of the shock. These arms H⁷⁰ may be considered the rear boundary of the sheaf-receiving space, but they are themselves adapted to yield rearward as the sheaves are accumulated. Such yielding will not usually occur until the arms H⁴⁷ have first yielded swinging stubbleward, and permitted all the space forward of the position occupied by the arms H⁷⁰ normally, to be filled. After that, further accumulation of the sheaves will force the arms H⁷⁰ rearward and the arms H⁴ are curved approximately in the path of the ends of the arms H⁷⁰, as the latter thus yield rearward, so that from the time the first sheaf is dropped on the carrier and sustained by the spring arms H⁴⁷, until the entire capacity of the carrier is occupied, the sheaves upon it stand upright and move rearward or stubbleward, or both, but chiefly rearward against yielding supports which prevent them from falling prostrate. The rock shaft H⁷ has a crank arm h⁷¹ and a link H⁷¹ connected to that crank arm extends to the clip H⁶⁰, which is clamped onto the link H⁵, and as that link is actuated by the mechanism above described to dump the carrier, the link H⁷¹ is actuated and actuates the rock shaft H⁷, and swings the arms H⁷⁰ rearward, opening the path for the sheaves to depart out of the carrier.

In order to insure the proper retention of the bundle in the carrier, in view of the fact that the latter consists of only approximately parallel arms with intervening spaces, and that the bundles stand on end, and in order, also, to facilitate the rearward movement of the sheaves, to permit which it is necessary to dispense with any transverse bars to connect the rearwardly extending arms of the carrier, and to cause which it is necessary to make the carrier open,—that is, not to provide for the closed floor, because the bundles are, in fact, carried out by engaging with the stubble, so that the machine withdraws the arms from under them,—I make these arms of sheet metal folded or rolled to form V-shaped channel bars with the angle open upwardly. When the sheaves are lodged endwise upon this carrier, some portion of the butts of the straw of each sheaf will lodge in the angles of one or more of these channel arms, and will thus be prevented from either dropping down or being split and hung astride a bar, as would otherwise happen. As the accumulation of other sheaves in the carrier forces those first delivered rearward, they will slide readily on the channel arms. It will be observed that all the mechanism pertaining to this carrier, not only the devices which permit the carrier to tilt over its horizontal axis rearward, but also that which permits its several arms to swing or fold together, as the case requires, receives mechanism from the one source,—viz: the rock shaft H⁶, controlled by the foot of the driver upon its crank arm H⁶¹, and that the up-lifting movement of the carrier, which is accompanied by the folding movement of the sheaf-retaining arms, is aided by the connection already described of the trunk H to the raising and lowering mechanism by which the weight of the machine operates as a counterbalance to the carrier. It will be observed that this trunk H, being pivoted as described in the fitting H², so as to swing horizontally rearward, may make this movement freely whenever an obstruction is encountered. Also, that such rearward swinging movement of the carrier trunk causes it to move up the inclined slope of the stirrup K; and in such movement, to be rocked by reason of the connection to it of the cable a⁸, in a direction to tilt upward its sheaf-carrying arms and all the mechanism thereon, thus tilting the trunk upward at the outer end when it swings rearward, and tending to take it clear off the obstruction which it has encountered. This expedient adapts it to escape damage from irregularities of the ground or bowlders or low stumps, which may escape the driver's notice and which may be passed by the elevation of the carrier thus attained even though they could not be passed by simply folding the carrier rearward the extent which it could fold without damage to its rearwardly extended arms.

In this machine, it is evident that after the grain passes the wheel, and while it is under the action of the binding mechanism, being inclined severely downward toward the butts, a front board is required to prevent it from sliding off the deck. Such a front board is represented in the drawings indicated by the letter $p$. It may be secured in any convenient manner to the adjacent parts of the deck, and, as represented, by a strap $p'$ at the grainward end, attaching it to the bundle frame. For the same reason, the sheaf carrier requires a front board or guard at the forward end, although the carrier is not necessarily so much inclined as the binder deck, but is preferably somewhat inclined, and the front or foot-board $h^6$ of the carrier is made to lean forward at an obtuse angle to the direction of the carrying arms when the latter are in sheaf-receiving position. The front board with this inclination serves also to guide the butts of the sheaves as they are ejected and are swinging toward the vertical position when the carrier is swung rearward by reason of encountering an obstacle. In order to permit that movement to such an extent as to clear any obstacle too high to be cleared by the elevation which results in the manner described, it is necessary that the carrier should collapse,—that is, that the arms should fold toward the trunk while the trunk is swung rearward, instead of themselves swinging around rearward and grainward against the main frame and harvesting mechanism. In order to effect this collapsing automatically, I utilize the foot-board $h^6$, which is secured and connected in a manner adapting it to that function. Two links $h^{60}$ $h^{60}$, pivotally connected to the trunk,—by the same bolts which fasten two of the carrier arms to the trunk,—are pivotally connected at the other ends to the foot-board $h^6$, and the foot-board is folded over the trunk H to the rear side thereof, and provided with apertures for the carrier arms respectively, which thereby assist in holding the foot-board in place. A link $h^{61}$ is connected to the grainward end of the foot-board, approximately in line with the apertures for the carrier arms, and extends therefrom to a pivotal connection provided for it on the stirrup K, rearward of the position at which the trunk H crosses the said stirrup while in normal position. It will be understood that when the carrier is swung rearward at the stubble end, the link $h^{61}$, forces the foot-board $h^6$ stubbleward longitudinally with respect to the trunk H, and causes each of the carrier arms to swing about its pivotal connection with the trunk, and collapse the carrier. This expedient may be resorted to to narrow up the machine to accommodate it to road-ways or gate-ways, the trunk being for such purpose tied back to the position to which it might be forced by an obstacle. At the grainward end of the trunk, I prefer to mount a small wheel $h^9$, which ordinarily is suspended above ground, but may ride on the ground when the drive wheel is running in a dead furrow, or otherwise on lower ground than that over which the stubble end of the carrier trunk is moving. This wheel is designed in such cases to prevent the bundles, which may be on the carrier and whose butts or portions of whose butts may protrude through between the carrier arms some distance, from being engaged by the stubble and taken off the carrier without or before the dumping movement of the carrier, which the driver controls.

I provide on this machine an attachment to the platform which may be used as an extension to increase the width of the platform for long straw, and also, as a means of evening the straw when it is short, and at all positions adapted to serve as a back-board or wind-guard to prevent the straw sliding or being blown off of the platform at the rear. This attachment consists of two leaves S S', hinged together, the former being hinged at its forward edge to the rear edge of the platform. Each of the hinges is provided with means for making it rigid to secure the device in any of the various positions to which it is adapted to be adjusted, as hereinafter explained. Thus, the hinge connection of the leaf S to the platform is made by hinging its stiffening strap $S^2$ at $s$ to the rear sill of the platform, while from that rear sill, a little below the pivot $s$, a lug or bracket $S^3$ projects rearward farther than said pivot, and a link $S^4$, pivoted to said bracket, has a sliding pivotal connection with the strap $S^2$ of the leaf S, which is obtained by means of a screw $s^4$ rigid with the lug $s^{40}$, taking into the slot $s^{41}$ of the link, and provided with a clamping nut $s^{42}$. It will be seen that as the leaf S rocks over its pivot $s$, the clamp nut being loose, the stud screw will move along the slot $s^{41}$, and that said nut being clamped at that point the leaf will be secured in the position it occupies, being thus held horizontally or vertically or inclined at any angle forward or rearward. The pintle of the hinge of the two leaves S S' to each other may be formed by a bolt $S^5$ provided with a nut $s^5$, which, upon being tightened, will clamp the hinge firmly enough to secure the two leaves at any desired angle to each other. For short grain, this device may be adjusted to a position of which that shown in dotted line in Fig. 12 is a specimen; that is to say, the leaf S inclined forward from its pivot and the leaf S' folded down in front of the leaf S at any desired angle, so that the heads of short grain, striking on the inclined surface of the leaf S', will be guided to the platform with a tendency to slide forward thereon. In case of extremely long grain the leaf S may be thrown back to a horizontal position, and the leaf S' alone made to serve as a back-board or wind-guard. From Fig. 12, it may be understood that a variety of positions may be given to this attachment to accommodate the varying conditions and length of the grain.

The cover plate or shield $y^{90}$ for the chain $M^{30}$ is hinged, as stated, at its forward edge, so that it may be tilted up when it is not desired to have the grain engaged by the chain, as will be the case when the grain is very ripe and the straw not high enough to cause the heads to hang down at the rear of the elevator, because the teeth of the chain, striking the thoroughly ripe heads, would tend to shell the grain out, and the assistance of the chain to carry the heads is not ordinarily necessary when they do not overhang the elevator at the rear. This shield also serves the purpose of a wind-break to protect the grain on the elevator from the force of the rear wind in the same manner as a back-board protects the grain lying on the platform carrier. It is usually desirable to operate the shield $y^{90}$ in the same manner as the backboard S is operated; that is, whenever it is necessary or desirable to tilt the latter upward, either to support the heads and guide them forward, or to guard them from the wind, it is desirable for like purposes to tilt the shield $y^{90}$ to take the grain out of the way of the chain or to guard it from the wind. I therefore provide for connecting the shield $y^{90}$ to the backboard so that they may be operated together, and so that the grain, guarded and guided by the backboard, shall be guided against or onto the shield $y^{90}$, and this is effected by extending the grainward end of the latter under the stubbleward end of the former, and connecting them by a bolt $S^6$, the hole $s^6$, through which it passes in one part or the other (as illustrated, it is in the part $y^{90}$) being elongated to accommodate the parts to various inclinations.

The seat Z is secured to the frame at the rear of the drive wheel, and so elevated that the driver seated thereon looking down the inclined deck in front of him, has almost an unobstructed view of the team and the track ahead, and looking off to the right over the elevator which is inclined down grainward and forward, he has a similarly unobstructed view of the grain immediately in front of the sickle and under the action of the reel, and looking off to the left down the similarly inclined binder deck, he has in like manner an unobstructed view of the action of the binder, of the discharge of the sheaves, of the sheaf carrier and the accumulation of the sheaves therein, and the track ahead of the sheaf carrier. He is thus able readily to observe, and, by means of the various controlling levers extended within reach of the seat, to direct and control, the several operations with the minimum of effort; and any derangement of any part, or hinderance to the proper action, either in the machine or in the field, will immediately gain his attention. Furthermore, the tendency to overbalance forward, which may be the effect of inclining the several decks and mechanisms thereon forward in the manner described, bringing the weight more largely forward of the axle than might otherwise be the case, or than would be the case were the machine tilted back to a more nearly horizontal position, is overcome by the counterbalancing weight of the driver on the rearwardly located seat.

I claim—

1. In a grain harvester, in combination substantially as set forth, the several successive mechanisms by which the grain is supported and carried from the grain side to the stubble side of the machine, said grain-supporting and actuating mechanisms being inclined upward from front to rear, and increasing in such inclination from grain to stubble side of the machine; whereby the grain is lifted from an approximately prostrate to an approximately upright position as it passes toward the discharge side.

2. In a grain harvester, a platform carrier comprising an endless conveyer whose grain side roller is inclined slightly up from front to rear, and whose stubble side roller is more inclined in the same manner, said rollers being in parallel fore-and-aft vertical planes: substantially as set forth.

3. In a grain harvester, in combination with the mechanism by which the grain is delivered sideward over the drive wheel; the binder deck whose receiving side is substantially parallel with the delivery side of said mechanism, said deck being curved downward and outward at the forward end, and relatively but slightly inclined at the rear end; whereby the grain passing over the same tends to fall on the butt ends: substantially as set forth.

4. In a grain harvester, in combination with a binder deck whose forward end is inclined downward toward the stubble side much more than the rear end; a post or horn projecting from said binder deck toward the rear and at the stubble side of the bundle space to arrest the heads of the bundles while the butts descend along the steeply inclined forward part of the deck to cause the bundles to be delivered upstanding on their butt ends: substantially as set forth.

5. In a grain harvester, in combination with the platform carrier and the elevator carrier whose forward end is farther back than the end of the platform carrier, a deck at the forward end of the elevator in the angle between the same and the forwardly projecting portion of the platform carrier, said deck being depressed at the stubbleward portion below the level of the elevator carrier, whereby the butts of the grain may overhang such depressed deck: substantially as and for the purpose set forth.

6. In combination with the elevator carrier, a deck at the forward end thereof depressed at the stubbleward part below the grain carrying surface of the elevator, and a butt-actuating device at the forward side of such depressed deck: substantially as set forth.

7. In combination with an elevator carrier, a deck at the forward side thereof depressed toward the stubbleward part below the grain-carrying surface of the elevator; an endless apron butter upstanding at the forward part of such depressed deck and extending stubbleward past the upper end of the elevator.

8. In combination with the elevator carrier and a deck at the forward end thereof depressed at the stubbleward part below the grain-carrying surface of the elevator and extending stubbleward beyond the delivery side of the elevator; an upstanding butter at the forward side of such depressed platform extending past the upper side of the elevator, and a toothed chain traveling upward at the forward side of the elevator past the upper roller thereof, and thence still stubbleward; whereby the butter and said chain co-operate to carry the grain overhanging the depressed deck clear of the elevator at the butts: substantially as set forth.

9. In a grain harvester, in combination with an elevator endless carrier, a platform whose forward end is forward of the forward end of the lower side of the elevator; a fixed deck at the forward end of the elevator; and a toothed wheel revolving up through the deck at the delivery side of the platform where the latter projects forward of the elevator: substantially as set forth.

10. In a grain harvester, in combination with an elevator endless carrier and a platform endless carrier extending farther forward than the receiving side of the elevator carrier; the elevator drive chain located at the forward side of the elevator provided with grain carrying teeth; and a deck at the forward side of the elevator through which the chain emerges at the grainward side farther rearward than the forward end of the platform carrier: substantially as set forth.

11. In a grain harvester, in combination with an elevator endless carrier, a platform or deck at the forward end; an upstanding butt-actuating apron at the forward side of said deck, and the butt-actuating teeth operating upward and stubbleward through the deck between the end of the elevator and butter: substantially as set forth.

12. In a grain harvester, in combination with an elevator endless carrier, a deck at the forward end thereof at a lower level than the carrying surface of the elevator carrier; and a chain having grain-actuating fingers operating at the forward margin of the elevator carrier overhanging the rear margin of said depressed deck: substantially as set forth.

13. In a harvester, in combination substantially as set forth, the elevator and the drive chain thereof at the forward end of the elevator; the shield overhanging the chain substantially in the plane of the carrying surface of the elevator, and the depressed deck at the forward side of the plane of the chain's path, the chain having carrying teeth set off therefrom at the forward side and projecting up in front of the forward edge of the shield.

14. In a grain harvester, in combination with an elevator endless carrier inclined upward from front to rear, a butt-actuating apron upstanding substantially at right angles to the plane of the rearwardly inclined elevator, and a depressed deck between the forward end of the elevator and the butt-actuating ply of the apron: substantially as set forth.

15. In a grain harvester, in combination with an elevator endless carrier and a deck at the delivery side thereof above the drive wheel; a deck at the forward end of the elevator commencing at the grainward side approximately at the level of the carrying surface of the elevator and extending stubbleward at less inclination than the latter at the level of said deck above the wheel; whereby it is lower than the elevator in front of the upper driving roller thereof: substantially as set forth.

16. In a harvester, a carrier comprising an endless apron and transverse stiffening bars thereon, and the grain-engaging knees $M^4$ hinged at one end between the said stiffening bars and the apron and having the other end resting upon the carrying surface of the apron and adapted to be stopped by the edge of the bars near the hinge pintle; whereby the tension of the apron tends to hold the free end against the apron: substantially as set forth.

17. In combination substantially as set forth, the front sill and the bar Q rigid therewith extending upward and forward of the vertical plane of the sill, and thence rearward above the receiving side of the elevator; the brace bar Q' rigid with the bar Q and extending stubbleward horizontally and thence downward to the sill, and the butter frame suitably supported at the grainward and stubbleward ends and having its upper and lower bars penetrated by the bar Q'.

18. In combination with the front sill, the bracket $y^7$ rigid therewith and projecting forwardly therefrom and provided with a socket at the forward part for the arm Q, said arm rigidly secured in said socket, and the brace arm Q' rigid therewith and extended stubbleward and downward to the sill: substantially as set forth.

19. In a grain harvester, in combination with the platform sills, the platform carrier pivoted thereto stubbleward from the end of the sills, the divider and grain wheel frame detachable from the platform frame and attachable to the end of the main frame sills: said sills being at their grainward ends adapted for such attachment substantially as set forth.

20. In a grain harvester, in combination with the carrier platform adapted to be tilted up, the reel adapted to be collapsed about the axial line of its shaft stubbleward: substantially as set forth.

21. In a grain harvester, the reel spider having lugs to which the bat arms $Q^{62}$ are pivoted, and between which the bat arms $q^{62}$ are seated, adapted to permit said arms to rock over said pivots and in said seats stubbleward past the vertical fore-and-aft plane of the pivots; the reel shaft projecting grainwardly through said spider, and the disk $Q^{63}$ on said shaft; and suitable means for securing the disk longitudinally on the shaft against the spider and releasing it to permit it to be moved outward on the shaft: to permit the bat arms to be rocked stubbleward substantially as and for the purpose set forth.

22. In a grain harvester, in combination with the main frame vertically adjustable on the drive wheel axle, a sheaf carrier supported on the main frame and adapted to be tilted thereon to dump its load; connections from the said carrier to the raising and lowering mechanism of the main frame, whereby the downward tilting of the carrier tends to elevate the main frame on the axle and the descent of the main frame tends to tilt the carrier up: substantially as set forth.

23. In a grain harvester, in combination with the main frame, the sheaf carrier having its trunk adapted to rock in supports on the main frame; a cable connected to said trunk; suitable guides around which said cable extends; and a lever fulcrumed on the main frame to which it is connected, the drive wheel axle, and means by which its rotation elevates the frame, and connections from said lever to the axle-rotating devices: substantially as set forth.

24. In a grain harvester, in combination with the drive wheel, its axle and the main frame supported thereon and adapted to be raised and lowered by the rocking or rotation of the axle; the worm wheel rigid with the axle, and the worm-shaft-bearing yoke; the worm having its shaft journaled therein meshing with the worm wheel; the link $A^3$ connected to the yoke; the link $A^4$ connected to the frame; the tightener wheel bearing arm $A^5$, and the chain tightener wheel thereon, the links $A^3$ and $A^4$ being pivotally connected to said wheel bearing arm at different points: substantially as and for the purpose set forth.

25. In a grain harvester, in combination with the drive wheel axle having the raising and lowering pinions, the main frame having the segments with which the pinions engage; the worm wheel rigid with the axle; a yoke pivoted about the axle, and the worm journaled therein engaged with the worm wheel; the lever $A^6$ $A^7$ fulcrumed on the main frame, and linked connections between the same and the worm-shaft-bearing yoke; the sheaf carrier fulcrumed and adapted to tilt by rocking on the main frame; the cable connections to said carrier and extending around suitable guides on the main frame and connected to the lever $A^6$ $A^7$; the tightener wheel bearing arm constituting an intermediate in the linked connections between the lever $A^6$ $A^7$ and the worm-shaft-bearing yoke; and the drive chain against which said tightener acts: substantially as and for the purpose set forth.

26. In a grain harvester, in combination with the main frame, the carrier having its shaft or trunk journaled thereon and adapted to dump the carrier; connections from said trunk to the raising and lowering mechanism on the main frame, whereby the weight of the machine tends to hold the carrier up, said carrier trunk having a lever arm; a rock shaft journaled on the main frame having a crank arm; a link from said crank arm to said lever arm; the crank arm and the lever being substantially in line when the carrier is in sheaf-receiving position: substantially as set forth.

27. In a grain harvester, in combination with the main frame and the carrier shaft journaled thereon and having a lever arm by which it is rocked to dump the carrier, a shaft journaled on the carrier having sheaf-retaining arms extending above the sheaf supports of the carrier and having a crank arm below the same; a rock shaft journaled vertically on the frame having two crank arms; a link from one of them to the lever arm by which the carrier is rocked, and a link from the other to the crank arm of the shaft of the outer sheaf-retaining-arms, whereby the rocking of the carrier to dump causes the sheaf-retaining arms to be swung aside: substantially as set forth.

28. In combination with the harvester frame, the carrier journaled thereon and having a crank arm by which it is rocked to dump its load, a link extending to said crank arm by which it is operated; a shaft journaled vertically on the harvester frame and having rear sheaf-retaining arms extending above the sheaf-supports of the carrier and having a crank arm; a link from said crank arm connected to the link which operates the carrier dumping arm, whereby the action of said link to dump the carrier swings the rear sheaf-retaining arms: substantially as set forth.

29. In a sheaf carrier for a grain harvester, in combination with a rock shaft or trunk, V-shaped channel bars upwardly open secured to said shaft or trunk projecting rearwardly therefrom and constituting the sheaf-supporting arms or fingers: substantially as set forth.

30. In a sheaf carrier for a grain harvester, in combination with a shaft or trunk, V-shaped channel bars secured thereto and projecting rearwardly therefrom and having their two legs or flanges tapered from the bars secured to the free ends, such bars constituting the sheaf-supporting arms or fingers of the carrier: substantially as set forth.

31. In combination with a harvester adapted to deliver the bound sheaves butt ends downward, a sheaf carrier having its sheaf-supporting arms composed of upwardly open V-shaped channel bars: substantially as set forth.

32. In a grain harvester, in combination with a binder adapted to deliver the bound sheaves butts downward, the carrier having the footboard leaning forward at an obtuse angle to the carrier arms: substantially as set forth.

33. In combination with the harvester, the sheaf-carrier supported on the harvester frame, said carrier having a trunk or main arm or shaft jointed near its support on the harvester frame to permit the carrier to swing rearward; a support or brace on the harvester frame inclined upward from front to rear on which the trunk is guided as it swings rearward, whereby it is given an upward movement in connection with such rearward movement: substantially as set forth.

34. In connection with a harvester frame, the sheaf-carrier trunk extending stubbleward from the frame, the latter having the stirrup bearing in which said trunk is journaled and adapted also to tilt upward, said trunk being jointed outward from its bearing to adapt it to swing rearward the stirrup rigid with the main frame underneath the trunk outward from said joint, said stirrup being inclined upward toward the rear from the lodgment of said trunk thereon to guide the latter upward as it swings rearward: substantially as set forth.

35. In combination with a harvester frame, the sheaf-carrier trunk journaled therein and adapted to rock in its journal bearings, and jointed outside of said bearings to adapt it to swing rearward, the stirrup outside of said joint having an upward inclination toward the rear to cause the trunk to tilt upward as it swings rearward, whereby the upward tilting of the frame as it swings rearward is accommodated by the rocking of the portion thereof inward from the joint in its bearings on the main frame: substantially as set forth.

36. In combination with a harvester frame, the sheaf-carrier trunk having its sheaf-supporting arms or fingers pivotally connected thereto; the foot-board linked to the trunk and apertured or notched to admit it between said sheaf-carrying arms or fingers to adapt it to swing rearward; a link connected to the harvester frame and to the foot-board, whereby the rearward sweep of the trunk causes the foot-board to collapse the arms: substantially as set forth.

37. In combination with the binder adapted to deliver the sheaves butts downward, the carrier having the spring arms secured at their outer ends and extending normally from the outer forward corner of the carrier obliquely rearward and inward and adapted to yield about their points of fastening at the outer forward corner; and the foot-board of the carrier leaning forward at an obtuse angle to the sheaf-supporting arms: substantially as set forth.

38. In combination with a binder adapted to deliver the sheaves butts downward, a carrier comprising supporting arms and spring arms secured to the carrier frame at the outer forward part and adapted to yield elastically about their points of fastening; the sheaf-retaining arms pivoted on the harvester and extending stubbleward across the same and curved to conform approximately to the path of the free ends of said yielding spring arms: substantially as set forth.

39. In combination with a binder adapted to deliver the sheaves butts downward; a carrier having sheaf-supporting arms and sheaf-retaining arms pivoted on the harvester frame and extending across the same and adapted to swing rearward about their pivotal support; outer sheaf-retaining arms pivoted on the carrier and extending rearward thereabove and curved at their rear portion to conform substantially to the path of the free ends of the rear sheaf-retaining arms: substantially as set forth.

40. In combination with the binder adapted to deliver the sheaves butts downward, the sheaf-supporting arms; spring arms secured to the carrier at the outer forward corner and extending obliquely grainward and rearward and adapted to yield elastically about their points of fastening; rear sheaf-retaining arms pivoted on the harvester frame and extending across the carrier and curved to conform substantially to the path of the free ends of said spring arms; and outer sheaf-retaining arms pivotally supported on the carrier frame at the outer forward part extending rearward above the sheaf-supporting arms of the carrier and curved to conform substantially to the path of the free ends of the rear supporting arms: substantially as set forth.

41. In combination with a binder adapted to deliver the sheaves butts downward, three sets of sheaf-supporting arms all adapted to swing upon upright supports above the sheaf-supporting arms of the carrier; one set extending across the carrier from the outer side inward; another set extending from the inner side outward, and the third set extending from the outer forward corner rearward and inward, and all adapted to swing about their points of support to permit the departure of the sheaves from the carrier: substantially as set forth.

42. In a grain harvester, in combination with the main frame, the reel-supporting frame comprising a post fulcrumed at its foot on the main frame, and the reel-bearing frame pivoted to the post at the upper end of the latter; a gear segment rigid with the reel-bearing frame concentric with the pivot thereof to the reel post; a journal bearing pivoted on the reel post; a shaft journaled therein and having a worm meshing with the rack, the rear end of said shaft having a bearing at the rear side of the machine in which it is adapted both to slide and rotate, and suitable means for locking it against longitudinal movement through said bearing: substantially as set forth.

43. In combination with the reel post and the reel bearing frame, the rack on the latter; the worm supported on the former engaging the rack; a shaft on said worm, the notched bar $q^8$ longitudinally stopped on the shaft; and the arm Q' rigid with the main frame, having a slot through which said shaft and notched bar are adapted to slide fore-and-aft and with which the bar is adapted to engage: substantially as set forth.

44. In a harvester reel, in combination substantially as set forth, the reel bearing frame and the reel shaft journaled therein, said frame having the bracket arm $Q^{51}$; the swinging bracket $Q^7$ having the sleeve $Q^{70}$, and pivoted to the reel bearing frame between the end of the reel-shaft and the end of said bracket arm, and adapted to swing at such pivotal connection about the axis of the reel shaft, the reel-driving shaft extending through said sleeve a pinion feathered on the shaft; and the beveled gear $Q^6$ rigid with the reel shaft: substantially as set forth.

45. In combination with the platform carrier, the head-board or wind-break comprising two leaves hinged together and adapted to be secured at an angle to each other, one of the leaves being hinged to the rear edge of the platform and adapted to be secured at any angle to the latter: substantially as set forth.

46. In combination with the elevator, the butter forward thereof, and the shield $Y^{66}$ extending from the top of the butter frame rearward overhanging the forward side of the elevator: substantially as set forth.

47. In combination with the elevator, the butter forward of the forward side thereof, and the depressed deck T between the elevator and the butter, and the shield $Y^{66}$ extending from the top of the butter frame rearward overhanging the depressed deck and the forward side of the elevator: substantially as set forth.

48. In combination with the elevator, a chain at the rear side thereof, and a shield $y^{90}$ hinged at its forward edge and adapted to be tilted up: substantially as and for the purpose set forth.

49. In combination with the elevator, the toothed chain at the rear side thereof, the shield $y^{90}$ over the chain and slotted to admit the teeth of the latter, and adapted to be tilted up to keep the grain out of the range of the chain and its teeth: substantially as set forth.

50. In a harvester, in combination with a deck inclined downward from rear to front above the drive wheel, and decks over which the grain is moved stubbleward from behind the sickle to such deck over the drive wheel inclined down forward and grainward, and the binder deck at the side of the wheel inclined down forward and stubbleward; and the driver's seat elevated at the rear of said deck over the drive wheel: substantially as set forth.

Signed at Chicago this 22d day of October, 1892.

PAUL HANSON.

Witnesses:
CHAS. S. BURTON,
JEAN ELLIOTT.